United States Patent
Chang et al.

(10) Patent No.: US 6,920,152 B1
(45) Date of Patent: Jul. 19, 2005

(54) APPARATUS AND METHOD FOR EXCHANGING VARIABLE-LENGTH DATA ACCORDING TO A RADIO LINK PROTOCOL IN A MOBILE COMMUNICATION SYSTEM

(75) Inventors: Hoon Chang, Seoul (KR); Hyun-Seok Lee, Songnam-shi (KR); Dae-Gyun Kim, Seoul (KR); Chang-Hoi Koo, Songnam-shi (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/577,512

(22) Filed: May 24, 2000

(30) Foreign Application Priority Data

May 24, 1999 (KR) .......................................... 1999-19540

(51) Int. Cl.$^7$ .................................................. H04J 3/24
(52) U.S. Cl. .......................................... 370/474; 370/320
(58) Field of Search .................................. 370/320, 342, 370/392, 394, 470–474, 321, 335, 337, 347, 428; 714/748, 749, 776, 779

(56) References Cited

U.S. PATENT DOCUMENTS

| | | | | |
|---|---|---|---|---|
| 5,677,918 A | * | 10/1997 | Tran et al. | 714/748 |
| 5,784,362 A | * | 7/1998 | Turina | 370/321 |
| 6,226,301 B1 | * | 5/2001 | Cheng et al. | 370/474 |
| 6,301,249 B1 | * | 10/2001 | Mansfield et al. | 370/394 |
| 6,473,399 B1 | * | 10/2002 | Johansson et al. | 370/229 |
| 6,542,490 B1 | * | 4/2003 | Ahmadvand et al. | 370/338 |

* cited by examiner

*Primary Examiner*—Man U. Phan
*Assistant Examiner*—Toan Nguyen
(74) *Attorney, Agent, or Firm*—Dilworth & Barrese LLP

(57) ABSTRACT

A method for transmitting a plurality of data frames in a mobile telecommunications system is disclosed. Each data frame has a frame sequence number and a data block. The method comprises the steps of segmenting a data frame into a plurality of data segments for retransmission, assigning the frame sequence number to each of said data segment, and assigning respective sequence numbers to the data bytes of each data segment to distinguish the first and last bytes of said data segment.

6 Claims, 13 Drawing Sheets

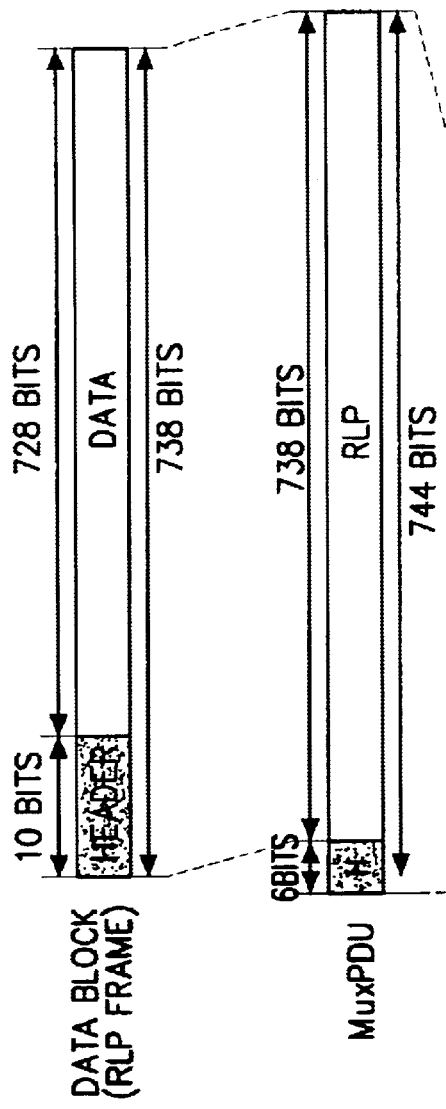
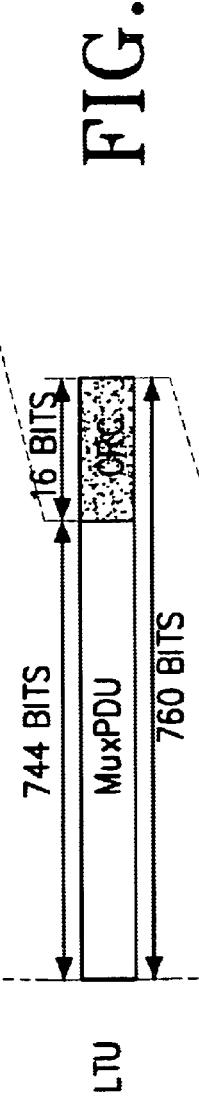
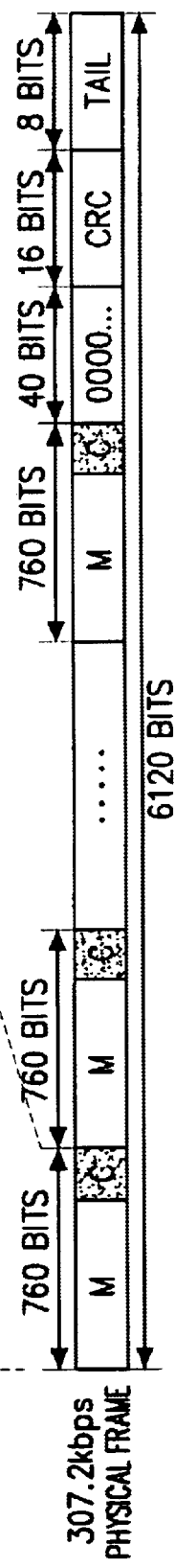
FIG. 5A
FIG. 5B
FIG. 5C
FIG. 5D

_US 6,920,152 B1_

APPARATUS AND METHOD FOR EXCHANGING VARIABLE-LENGTH DATA ACCORDING TO A RADIO LINK PROTOCOL IN A MOBILE COMMUNICATION SYSTEM

PRIORITY

This application claims priority to an application entitled "Apparatus and Method for Exchanging Variable-Length Data according to Radio Link Protocol in Mobile Communication System" filed in the Korean Industrial Property Office on May 24, 1999 and assigned Ser. No. 99-19540, the contents of which are hereby incorporated by reference.

BACKGROUND OF THE INVENTION

1. Field of the Invention

The present invention relates generally to a CDMA (Code Division Multiple Access) mobile communication system, and in particular, to a device and method for transmitting and receiving data according to a radio link protocol (RLP) used for effective data transmission in radio environments.

2. Description of the Related Art

In general, CDMA mobile communication systems have developed from the IS-95 standard, which mainly provides voice service, into the CDMA-2000 standard, which provides high-speed data service as well as voice service. The CDMA-2000 standard can provide high-quality voice service, moving picture service and Internet search service.

FIG. 1 shows an exemplary packet data service defined by the CDMA-2000 standard. In FIG. 1, a mobile station (MS) includes a terminal equipment (TE) and a mobile terminal (MT). A base station is represented by BS/MSC (Base Station/Mobile Switching Center), and an interworking function block (IWF) connects the BS/MSC to a data network (e.g., Internet). The IWF block is a device for converting protocols from one to another, when different protocols are used. In FIG. 1, the upper layer service (or Web service) processors of the mobile station and the IWF block form messages which are passed down through a network protocol (e.g., Internet protocol (IP)) processor and a link protocol (e.g., point-to-point protocol (PPP)) processor. Then, the data assembled by the upper layer service processors is finally transmitted to the lower layers in the form of a link protocol packet, and the lower layers transmit the data using a proper protocol (e.g., EIA-232, RLP, etc). Although the term "processor" is used herein, it would be understood by one skilled in the relevant art that these are "processes" that may be performed on one or more processors or devices.

FIG. 1 shows an example where an EIA-232 controller is used between the TE and the MT. Generated RLP frames are transmitted over a physical channel connected according to the IS-2000 standard, which is part of the CDMA-2000 standard. The RLP packets received at the base station over the connected physical channel are restored back to link protocol packets and the restored packets are transmitted to the IWF block through the relay layer. In general, interfacing between the base station and the IWF block is performed according to the IS-658 standard. In the IWF block, the link protocol layer reads data from the link protocol packets and transmits the data to the network protocol processor, where the data is finally transmitted to the upper service processor. The distribution of link protocol packets into radio link protocol (RLP) frames through the RLP is one of the subjects of the present invention.

Above, a description has been made of a process for transmitting data from the mobile station to the base station, and it should be noted that the process for transmitting the data from the base station to the mobile station can be performed in a similar manner. To provide various services, the CDMA-2000 standard supports various schemes different from that of FIG. 1. However, they have a common feature in that the link protocol packets with the upper service data are transmitted over the radio physical channel through the RLP.

The present RLP Type-3 specification generates only the RLP frame having a size proper to fill a physical channel frame of 9.6 Kbsp or 19.2 Kbps for the current Rate Set 1, or the RLP frame having a size proper to fill a physical channel frame of 14.4 Kbps or 28.8 Kbps for the Rate Set 2. Therefore, when the physical channel operates at the higher rate of 153.6 Kbps or 230.4 Kbsp, a method is used for filling several RLP frames in one physical channel frame. If the physical channel supports a rate over 153.6 or 230.4 Kbps which is the maximum rate supported in the RLP Type-3 specification, for example, if the physical channel supports the rates of 307.2 Kbps, 460.8 Kbps, 614.4 Kbps and 1036.8 Kbps, more RLP frames can be filled in one physical channel frame. However, as compared with the method for filling one physical channel with one large-sized RLP frame, this method causes an increasing burden on the frame header and unusable parts of the frame, thereby decreasing the frame efficiency. Therefore, to transmit a RLP frame with a size larger than the current RLP Type-3 frame, a new method is required.

One of the important things that should be performed according to the RLP Type-3 specification is to segment a frame into smaller parts (segmented frames) when the size of the frame is greater than the size of the data block allowable for transmission. The conditions of segmentation are as follows:

First, the maximum number of the segmented frames is 3, i.e., first, second and last segmented frames. If the frame needs to be segmented into more than the three parts, it is not transmitted until it can be segmented into three parts.

Second, the reassembling of the segmented frames is only allowed when all of the segmented frames have been received Thus, if one of three segmented frames (first, second or last) is not received, all of the three segmented frames are retransmitted.

However, the RLP type-3 specification can only generate the RLP frame with a size adequate for filling the physical channel frame of 9.6 Kbsp or 19.2 Kbps for the Rate Set 1 or the RLP frame with a size adequate for filling the physical channel frame of 14.4 Kbps or 28.8 Kbps for the Rate Set 2. This means that, at maximum, three segmented frames must suffice for transmission, which is acceptable at the lowest transmission rates of 9.6 Kbps or 14.4 Kbps. However, if the physical channel has a greater transmission rate, which uses a greater RLP frame in order to improve the transmission efficiency of the RLP, another segmentation method is required different from the conventional segmentation.

SUMMARY OF THE INVENTION

It is, therefore, an object of the present invention to provide a device and method for transmitting an RLP frame of various lengths when transmitting data according to an RLP in a mobile communication system.

It is another object of the present invention to provide a device and method for transmitting an information frame (or physical frame) having various frame sizes and structures with more data by effective multiplexing/demultiplexing control in order to support the RLP frame of various lengths while transmitting data according to an RLP in a mobile communication system.

To achieve the above and other objects, there is provided an information frame of a new format transmitted according to a radio link protocol (RLP), and a device and method for transmitting and receiving the information frame in a mobile communication system. The information frame is comprised of a plurality of consecutive multiplex frames each having a given length. The multiplex frames each are comprised of a header and a succeeding RLP frame, and the RLP frame includes transmission data. At least one of the multiplex frames is comprised of a plurality of sub-multiplex frames, and each sub-multiplex frame is comprised of a header including an RLP service identifier field and a length indication field for indicating a length of the transmission data, and a data block associated to the succeeding RLP frame.

BRIEF DESCRIPTION OF THE DRAWINGS

The above and other objects, features and advantages of the present invention will become more apparent from the following detailed description when taken in conjunction with the accompanying drawings in which:

FIGS. 5A to 5D are diagrams illustrating a format of the frames generated according to an embodiment of the present invention;

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

Figure 1:
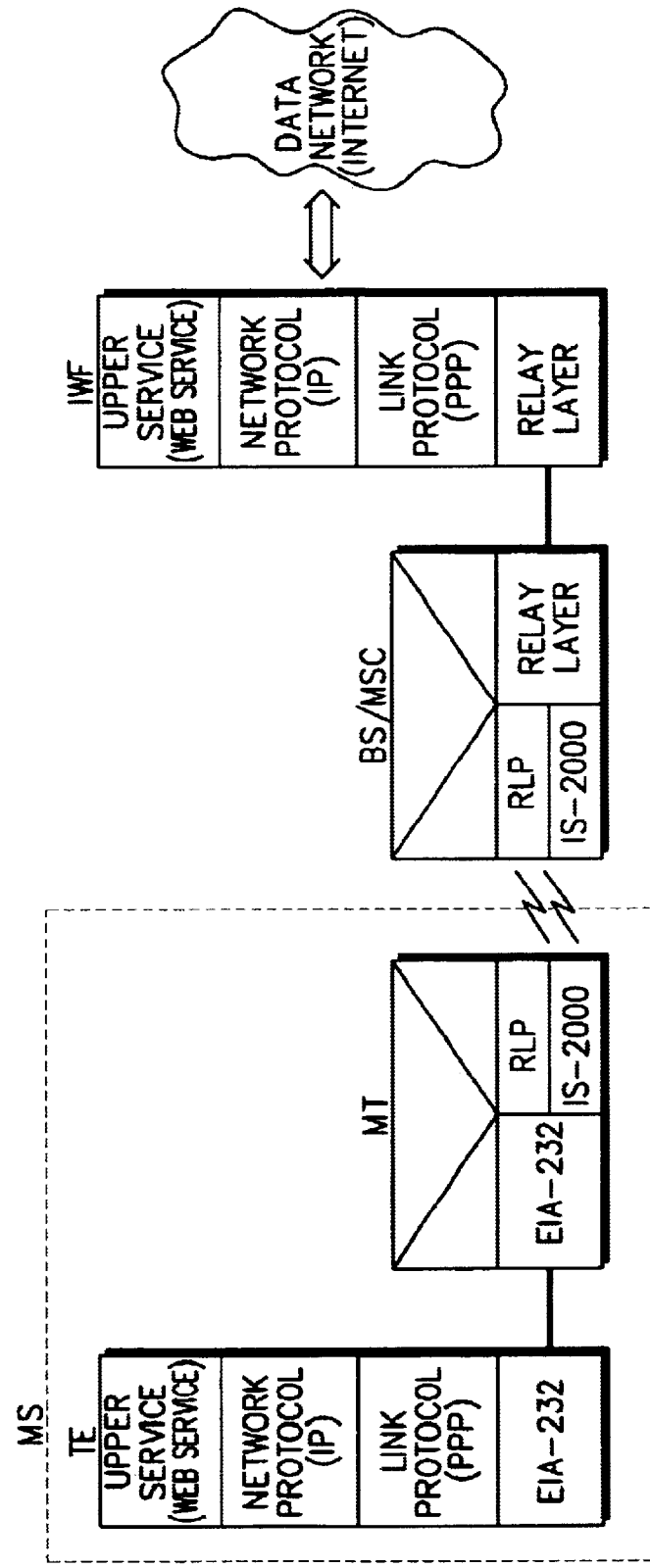
FIG. 1 is a diagram illustrating a general CDMA communication system for performing a packet data service.
Figure 2:
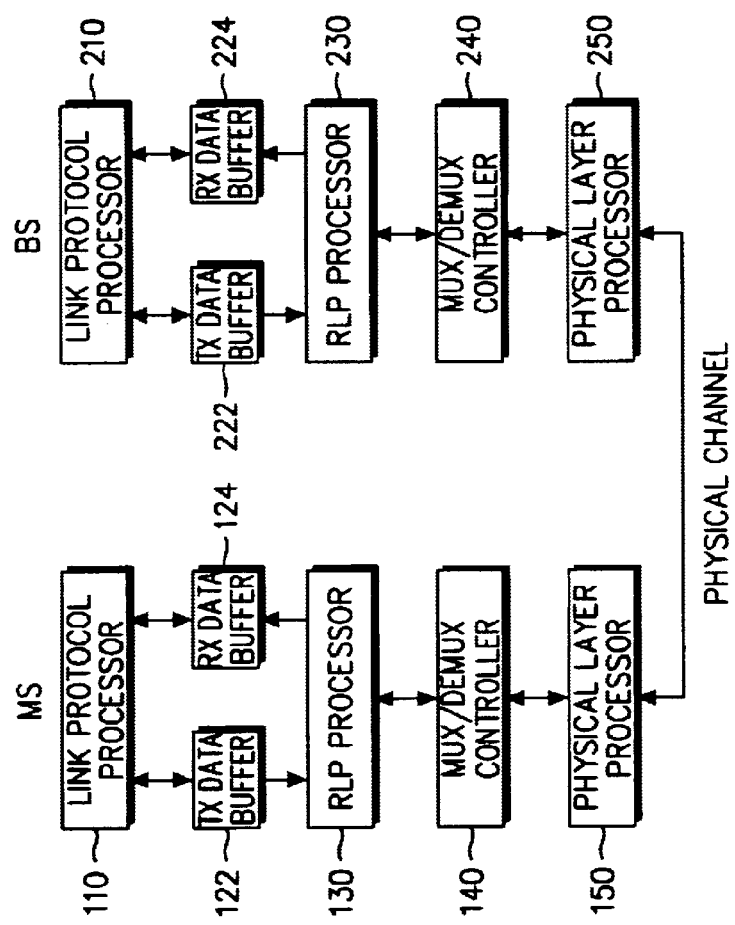
FIG. 2 is a diagram illustrating a device for transmitting and receiving data according to the RLP, to which the present invention is applicable.

FIG. 2 shows a structure of a mobile communication system for transmitting and receiving data according to the RLP, to which the present invention is applicable.

Referring to FIG. 2, physical layer processors 150 and 250 connect a physical channel between the mobile station and the base station, respectively, according to the IS-2000 specification, transmit the RLP frames provided from associated RLP processors 130 and 230, respectively, to the other party's physical layer over the connected physical channel, and transmit the RLP frames received over the physical channel to RLP processors 130 and 230, respectively. Multiplexing/demultiplexing controllers 140 and 240 are interposed between the respective RLP and physical layer processors.

Multiplexing/demultiplexing controllers 140 and 240 have the multiplexing function of attaching the destination and size information at the head of the RLP frames received from RLP processors 130 and 230, respectively, and transmitting the multiplexed RLP frames to the physical layer processors 150 and 250, respectively. Further, the multiplexing/demultiplexing controllers 140 and 240 have the demultiplexing function of detecting the destination and size information of RLP frames received from the physical layer processors 150 and 250, respectively, and then transmitting the detection results to the upper RLP processors 130 and 230, respectively. Transmission data buffers 122 and 222 are memory devices for storing data received from link protocol (i.e., PPP) processors 110 and 210. The transmission data buffers 122 and 222 segment in sequence the stored packets by the required size at the request of the RLP processors 130 and 230, respectively. The reception data buffers 124 and 224 store in sequence the data provided from the RLP processors 130 and 230, respectively. The stored data is transmitted to the PPP processor or the IWF block by the EIA-232 controller or the IS-658 controller. The EIA-232 controller or the IS-658 controller operates according to the EIA-232 specification or the IS-658 specification, respectively, and performs or controls data exchange between the data buffers 122, 124, 222 and 224 and the link protocol processors 110 and 210. For the current CDMA-2000 packet service, it is possible to use a controller other than the EIA-232 controller and the IS-658 controller. For this reason, the controllers are not shown in FIG. 2.

Figure 3:
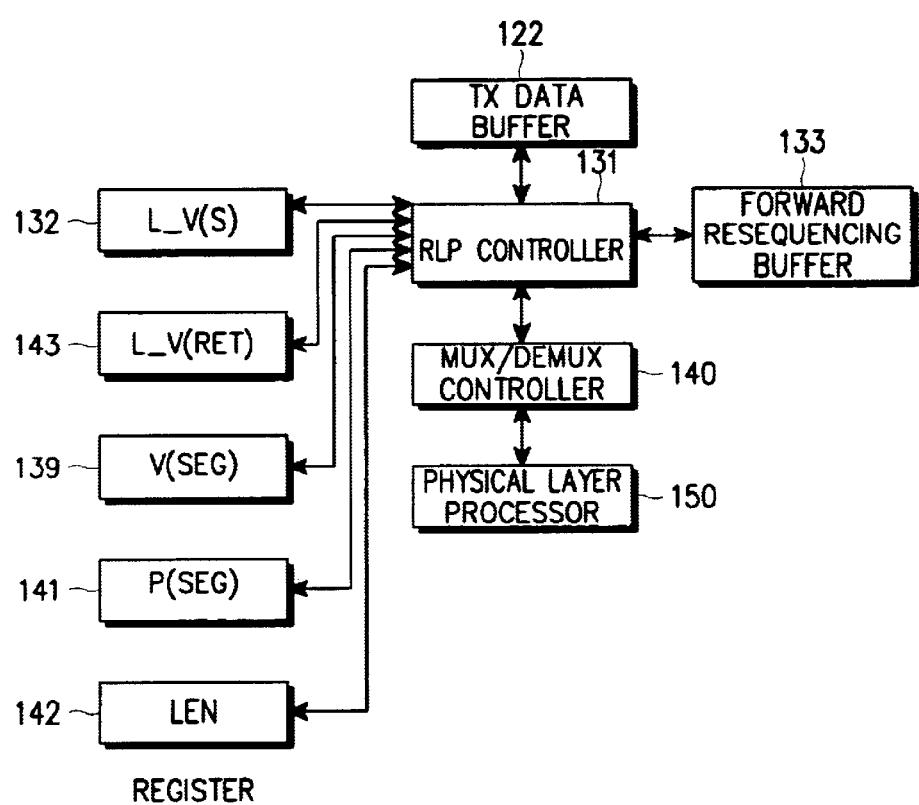
FIG. 3 is a diagram illustrating a data transmitter according to an embodiment of the present invention.

FIG. 3 shows a data transmitter according to an embodiment of the present invention. Referring to FIG. 3, the RLP processor 130 for transmitting the RLP frame includes an RLP controller 131, L_V(S) register 132, forward resequencing buffer (or retransmission buffer) 133, L_V($N_R$) register 139, P(SEG) register 141, LEN register 142, and L_V(RET) register 143. The RLP controller 131 generates an RLP frame from the data supplied by the transmission data buffer 122, which is contained in a data block transferred to the multiplexing/demultiplexing controller 140. The forward resequencing buffer 133 is a memory device for storing the resequencing data.

In the preferred embodiment of the present invention, the V(SEG) register 139 stores a sequence number of the first data byte of the resequencing data loaded in the segmented frames transmitted. In addition, the address of the first data byte of the resequencing data is stored into the P(SEG) register 141. The length (size) of the data bytes remaining after the transmission is registered in the LEN register 142. The L_V(RET) register 143 holds the sequence number of the next resequencing frame. L_V(S) register 132 holds the frame sequence number of the next data frame to be supplied to the multiplex sublayer.

Figure 4:
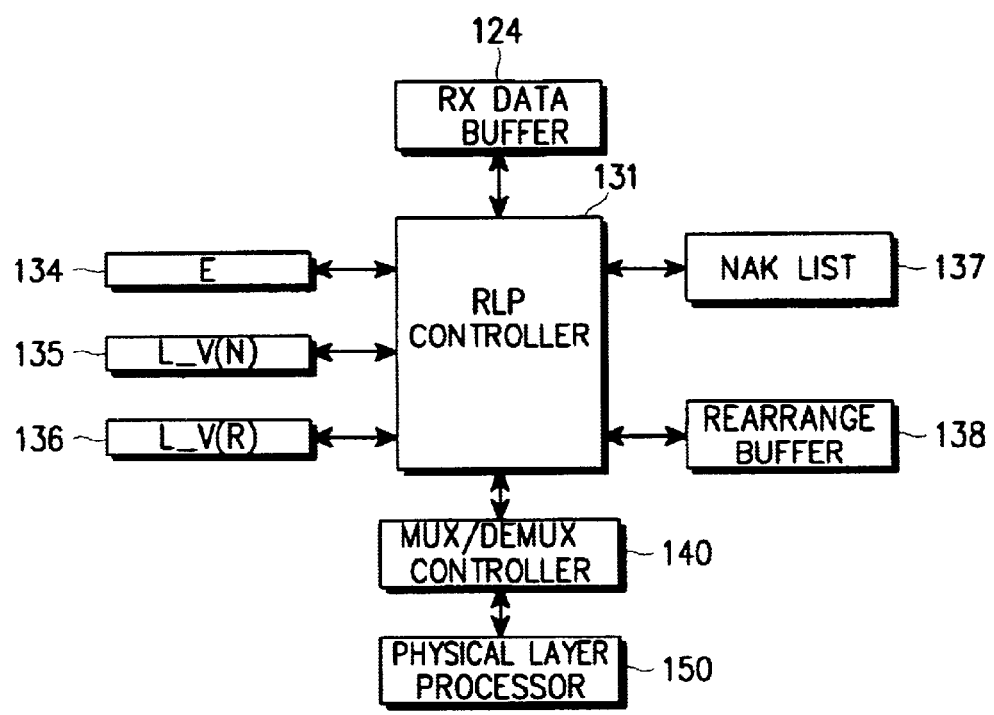
FIG. 4 is a diagram illustrating a data receiver according to an embodiment of the present invention.

FIG. 4 shows a data receiver according to an embodiment of the present invention. Referring to FIG. 4, the RLP processor 130 for receiving the RLP frame includes the RLP controller 131, an E register 134, an L_V(N) register 135, L_V(R) register 136, a NAK list 137 and a rearrange buffer 138. The RLP controller 131 determines whether the RLP frame received from the multiplexing/demultiplexing controller 140 is data in the correct sequence. If so, the RLP controller 131 stores the data in the receiving data buffer 124. Otherwise, the RLP controller 131 stores the data in the rearrange buffer 138, and then records the portion (portion) requested for retransmission in the NAK (Non Acknowledge) list 137, which is included in the next transmitted control frame. The E register 134 records the number of damaged (or bad) data blocks. When the multiplexing/demultiplexing controller 140 notifies the RLP controller 131 of the damaged data blocks, the RLP controller 131 records this value in the E register 134 to use it when reestablishment is required. The L_V(N) register 135 stores the sequence number of the first byte damaged in the received data.

The operation of generating an RLP frame of variable length and transmitting/receiving the generated RLP frame according to an embodiment of the present invention can be broadly divided into the operation performed by the multiplexing/demultiplexing controllers 140 and 240, and the operation performed by the RLP processors 130 and 230. Since the multiplexing/demultiplexing controllers 140 and 240 have the same operation and the RLP processors 130 and 230 also have the same operation, a description of the operation according to an embodiment of the present invention will be limited to the multiplexing/demultiplexing controller 140 and the RLP processor 130, for simplicity.

A. Tx/Rx Operation of the Multiplexing/Demultiplexing Controller

1. Tx Operation of the Multiplexing/Demultiplexing Controller

It is possible to simultaneously transmit not only packet data but also various other types of information, including voice data, over a presently connected physical channel. Therefore, any process providing data to be transmitted to the multiplexing/demultiplexing controller will be referred to as a "service". Further, the transmission unit that the multiplexing/demultiplexing controller 140 and the physical layer processor 150 exchange with each other will be referred to as "information bits" or as a "physical frame", and the transmission unit that the upper layer service blocks, including the RLP processor 130, and the multiplexing/demultiplexing controller 140 exchange with each other will be referred to as "RLP frame" or "data block".

The multiplexing/demultiplexing controller 140 of the transmission side should generate the information bits to be transmitted to the physical layer processor 150 and transmit the generated information bits every set time (e.g., 20 ms). That is, the multiplexing/demultiplexing controller 140 should generate information bits to be filled in a payload of the frame to be transmitted over the physical channel with respect to all the presently connected physical channels and transmit the generated information bits. The IS-2000 specification defines a fundamental channel (FCH), a dedicated control channel (DCCH) and a supplemental channel (SCH). The multiplexing/demultiplexing controller 140 transmits the following fields, when transmitting the generated information bits to the physical layer processor 150 in order to transmit the generated information bits over any one of the fundamental channel, the dedicated control channel and the supplemental channel.

SDU (Service Data Unit): This field is filled with the information bits to be actually transmitted. If there is no information bit to be transmitted, this field is filled with a null value previously determined between the multiplexing/demultiplexing controller and the physical layer.

FRAME_SIZE: This field is filled with the size information of the physical channel frame in which the information bits are filled. When the SDU field is filled with the null value, this field value is ignored in the physical layer.

FRAME_RATE: This field indicates a transmission rate of the physical channel frame in which the information bits are filled. When the SDU field is filled with the null value, this field value is ignored in the physical channel.

When the multiplexing/demultiplexing controller 140 of the transmission side transmits the above field values to the physical layer processor 150, the physical layer processor 150 processes the provided values in the designated coding and demodulation method and then transmits the processed results to the receiving side.

To generate the payload or information bits of a logical transmission unit to be transmitted to the physical channel, the multiplexing/demultiplexing controller 140 of the transmission side uses a data block to be transmitted in the services corresponding to the physical channel to which the logical channel is presently connected. The service corresponding to the physical channel to which the logical channel is connected, refers to a service which can transmit its data block to the physical channel which will transmit the presently generated information bits. A process for connecting such a service between the mobile station and the base station and connecting the logical channel for the service to the physical channel is available with the signaling message and the signaling procedure, defined by the IS-2000 specification.

The multiplexing/demultiplexing controller 140 of the transmission side receives the data block of a proper length (see FIG. 5A) from the service according to a priority order, upon deciding to transmit the data block for the services corresponding to the physical channel to which the logical channel is presently connected. The multiplexing/demultiplexing controller 140 creates a service identifier and a multiplex frame MuxPDU (see FIG. 5B) in which the length information is attached to the data block, so that it is possible to know a service for transmitting the data block received from the multiplexing/demultiplexing controller of the receiving side when receiving the data block from the service. The multiplex frame MuxPDU can include several data blocks and signaling messages provided from several services. The information bits include one or more MuxPDUs, and can further include a CRC (Cyclic Redundancy Code) for checking errors at every one or several MuxPDUs. When the CRC for checking errors every several MuxPDUs is added, one CRC and a portion of the information bits protected by the CRC are called a "logical transmission unit (LTU)". When the CRCs are inserted such that the information bits to be transmitted to the physical layer are segmented into several portions and error checking is performed on every segmented portion, it is said that "logical transmission unit is used". Here, each portion of the segmented information bits is referred to as "logical transmission unit", and the remaining portion of the logical transmission unit excluding the CRC, protected by the CRC, will be referred to as "a payload of the logical transmission unit" (FIG. 5C). This logical transmission unit becomes a base unit for determining whether the physical frame is correctly received at the multiplexing/demultiplexing controller of the receiving side. If the logic transmission units are not used, a basic unit for determining whether the physical frame is correctly received becomes the information bits.

The multiplexing/demultiplexing controller 140 of the transmission side should know beforehand possible transmission rates and sizes of the information bits with respect to the presently transmitted physical channel, and should also know whether logic transmission units are used or not, the set size of the logic transmission unit if it is used, and a CRC generation method. Such a configuration is used to determine the size of the information bits generated by the multiplexing/demultiplexing controller 140 according to the present condition of the physical channel provided from the physical layer and determine a method for generating logic transmission units, within a limit previously determined between the mobile station and the base station. If it is decided to use logic transmission units, the multiplexing/demultiplexing controller 140 of the transmission side fills the payload of the logic transmission unit with MuxPDU including a data block, fills the remaining portion with the fill MuxPDU or the fill bit pattern, and then generates a CRC for the payload of the generated logic transmission unit. The multiplexing/demultiplexing controller 140 of the transmission side repeats the above process as many times as the required number of the logic transmission units, sequentially fills the information bits with the generated logic transmission units, fills the remaining portion with 0's, and then provides the resulting information bits to the physical layer processor 150.

If it is decided not to use the logic transmission unit, the multiplexing/demultiplexing controller 140 fills the information bits with MuxPDU including a data block, fills the remaining portion with the fill MuxPDU or the fill bit pattern, and then transmits the generated information bits to the physical channel.

When there are no more data blocks to be transmitted, the multiplexing/demultiplexing controller 140 uses the MuxPDU to which is attached a specific service identifier previously appointed with the multiplexing/demultiplexing controller of the receiving side, or uses a regular bit pattern previously appointed with the multiplexing/demultiplexing controller of the receiving side, in order to fill the remaining portion of the information bits. Herein, the MuxPDU to which the specific service identifier is attached will be referred to as "fill MuxPDU" and the regular bit pattern will be referred to as "fill bit pattern".

In the above process, when there is no signaling message or data block received from the services corresponding to the physical channel to which the logical channel is connected, and from the signaling message generator, the multiplexing/demultiplexing controller 140 operates differently according to the physical channel to be presently transmitted. That is, the multiplexing/demultiplexing controller 140 trasmits a null value to SDU for the dedicated control channel or the supplemental channel. For the fundamental channel, the multiplexing/demultiplexing controller 140 transmits, as the information bits, a regular bit pattern previously appointed with the multiplexing/demultiplexing controller of the receiving side to the physical channel. Herein, the regular bit pattern will be referred to as "null traffic".

'A null data block' is transmitted to indicate that the service has no data block to transmit to the multiplexing/demultiplexing controller of the transmission side. The null data block is a data block with no contents, and is used only for a special purpose.

2. Rx Operation of Multiplexing/Demultiplexing Controller

The physical layer processor 150 of the receiving side, shown in FIG. 2, analyzes a received signal using a designated decoding and demodulation method, and transmits the information bits filled in the received physical frame to the multiplexing/demultiplexing controller 140 of the receiving side. The physical layer controller 150 transmits the following information, when transmitting the analyzed information bits to the multiplexing/demultiplexing controller 140.

SDU: This field is filled with the information bits to be actually transmitted. If there is no received information bit or a damaged frame is received, this field is filled with a null value previously determined between the multiplexing/demultiplexing controller 140 and the physical layer processor 150.

FRAME_QUALITY: This field indicates whether or not the received frame is a valid frame.

FRAME_SIZE: This field is filled with the size information of the received physical channel frame. This field value is determined according to a transmission rate of the received physical channel frame.

FRAME_RATE This field is filled with the transmission rate of the received physical channel frame.

The multiplexing/demultiplexing controller 140 of the receiving side should previously know the transmission rate and size (length and number) of the information bits with respect to the presently received physical channel, and should also know whether the logic transmission unit is used or not, the size of the logic transmission unit if it is used, and a CRC generation method. Such a configuration can be determined according to the above information provided from the physical channel processor 150 within a limit previously appointed between the mobile station and the base station.

If the physical channel processor 150 of the receiving side fills the SDU with the null value, judging that no physical channel, frame is received, and fills in the FRAME_QUALITY field so as to indicate that a valid frame is received, then the multiplexing/demultiplexing controller 140 of the receiving side informs all the services corresponding to the physical channel to which the logical channel is connected that no frame is received.

When the physical layer processor 150 of the receiving side does not fill the SDU with the null value or fills in the FRAME_QUALITY field so as to indicate that a damaged frame is received, the multiplexing/demultiplexing controller 140 of the receiving side determines whether the logic transmission unit is used for the received frame, based on the configuration and the information provided from the physical layer processor 150 of the receiving side.

If the logic transmission unit is used, the multiplexing/demultiplexing controller 140 of the receiving side determines the length of the logic transmission unit, a CRC checking method and the number of logic transmission units. The multiplexing/demultiplexing controller 140 divides the received information bits into as many logic transmission units as the number of logic transmission units. Since the multiplexing/demultiplexing controller 140 previously knows the length and number of the logic transmission units, it can separate out the logic transmission units by dividing the received information bits into the groups as many as the number of the logic transmission units.

When the assigned physical channel transmits the received information bits, the multiplexing/demultiplexing controller 140 of the receiving side determines whether the received information bits are damaged or not, depending on the FRAME_QUALITY field transmitted from the physical channel. If the received information bits are damaged and the received information bits are segmented into several logic transmission units, the multiplexing/demultiplexing controller 140 analyzes the CRC of each logic transmission unit again, separated in the above process, to determine whether there exist error-free logic transmission units.

If there exists an erroneous logic transmission unit, the multiplexing/demultiplexing controller 140 informs all the services corresponding to the physical channel to which the logic channel is connected that a damaged data block is received, with respect to the erroneous logic transmission unit. The LTU may correspond to more than one data block. At this point, the multiplexing/demultiplexing controller 140 also informs the respective services of the maximum length of the corresponding service data block included in the damaged logic transmission unit, with respect to the respective services. If the size of the LTU is known, the maximum value of the data block can be calculated by subtracting the size of MUX PDU header from the size of the LTU.

When the received information bits are damaged and LTUs are not used (meaning that the received information bits have no CRC for checking an error every one or several MuxPDUs), the multiplexing/demultiplexing controller 140 of the receiving side informs all the services corresponding to the physical channel to which the logical channel is connected that a damaged data block is received. At this point, the multiplexing/demultiplexing controller 140 also informs the respective services of the maximum length of the corresponding service data block which can be included in the damaged logic transmission unit, with respect to the respective services.

When an error-free logic transmission unit or information bits is received, the multiplexing/demultiplexing controller 140 of the receiving side separates out error-free MuxPDUs from the fill bit pattern in the information bits. If the separated MuxPDU is not the null traffic or the fill MuxPDU, the multiplexing/demultiplexing controller 140 transmits the data block included in the MuxPDU and a length of the data block to the service designated by the service identifier of the MuxPDU.

After the receiving process, if an error-free logic transmission or information bit is received and there is null traffic on a logical channel of a service, the multiplexing/demultiplexing controller 140 of the receiving side informs the respective service that a null data block is received.

B. Tx/Rx Operation of the Multiplexing/Demultiplexing Controller According to an Embodiment of the Invention A transmitting/receiving operation of the multiplexing/demultiplexing controller 140 according to an embodiment of the present invention will be more apparent from the following detailed description. The IS-2000 standard specifies several dedicated traffic channels such as a fundamental channel, a supplemental channel and a dedicated control channel. Therefore, the transmitting and receiving operation of the multiplexing/demultiplexing controller 140 according to an embodiment of the invention may be described separately for two cases. One where it is applied to the fundamental channel and another case it is applied to the supplemental channel. Since the dedicated control channel can be applied to a special case where the fundamental channel operates only at 96.Kbps or 14.4 Kbps, a separate description of the dedicated control channel will be avoided herein.

Further, the operation may be separately described for the case where the logic transmission unit is used and the other case where the logic transmission unit is not used. Here, the case where the logic transmission unit is used corresponds to a case where data is coded using a convolutional code before transmitting and receiving the data, and the case where the logic transmission unit is not used corresponds to a case where the data is coded using a turbo code before transmitting and receiving the data.

1. Information Bit Number of the Fundamental Channel and Supplemental Channel

Prior to describing an operation according to an embodiment of the present invention, the information bit number of the fundamental channel and the information bit number of the supplemental channel specified by the IS-2000 standard are first shown in Tables 1 to 4. More specifically, Tables 1 and 2 show the information bit number of the fundamental channel specified by the IS-2000 standard, and Tables 3 and 4 show the information bit number of the supplemental channel. Tables 1 and 3 show the information bit number of Rate Set 1 based on the transmission rate of 9600 bps, and Tables 2 and 4 show the information bit number of Rate Set 2 based on the transmission rate of 14400 bps.

TABLE 1

Information Bit Number of IS-2000 Fundamental Channel (Rate Set 1)

| Transmission Rate | Information Bit Number |
| --- | --- |
| 9600 bps | 172 bits |
| 4500 bps | 80 bits |
| 2700 bps | 40 bits |
| 1500 bps | 16 bits |

TABLE 2

Information Bit Number of IS-2000 Fundamental Channel (Rate Set 2)

| Transmission Rate | Information Bit Number |
| --- | --- |
| 14400 bps | 267 bits |
| 7200 bps | 125 bits |
| 3600 bps | 55 bits |
| 1800 bps | 21 bits |

TABLE 3

Information Bit Number of IS-2000 Supplemental Channel (Rate Set 1)

| Transmission Rate | Information Bit Number |
| --- | --- |
| 9600 bps | 172 bits |
| 19200 bps | 360 bits |
| 38400 bps | 744 bits |
| 76800 bps | 1512 bits |
| 153600 bps | 3048 bits |
| 307200 bps | 6120 bits |
| 614400 bps | 12264 bits |

TABLE 4

Information Bit Number of IS-2000 Supplemental Channel (Rate Set 2)

| Transmission Rate | Information Bit Number |
| --- | --- |
| 14400 bps | 267 bits |
| 28800 bps | 552 bits |
| 57600 bps | 1128 bits |

TABLE 4-continued

Information Bit Number of IS-2000 Supplemental Channel (Rate Set 2)

| Transmission Rate | Information Bit Number |
|---|---|
| 115200 bps | 2280 bits |
| 230400 bps | 4584 bits |
| 460800 bps | 9192 bits |
| 1036800 bps | 20712 bits |

It should be noted that Tables 1 to 4 have not shown all the information bit sizes specified by the IS-2000 standard.

When the LTU (Logic Transmission Unit) is used corresponding to the information bit numbers having a sufficient number of bits shown in Tables 3 and 4, the size and number of the LTUs may be calculated as shown in Tables 5 and 6 below. At this point, the information bit number may be calculated by adding the bits remaining after multiplying the size of the LTU by the number of the LTU. In addition, the size of the payload of the LTU is calculated by subtracting the size of the CRC 16 bits from the following Tables 5 and 6.

TABLE 5

LTU Applied to Supplemental Channel (Rate Set 1)

| Transmission Rate | LTU Size | LTU Number | Remaining Bits |
|---|---|---|---|
| 9600 bps | — | None | — |
| 19200 bps | — | None | — |
| 38400 bps | 368 bits | 2 | 8 bits |
| 76800 bps | 376 bits | 4 | 8 bits |
| 153600 bps | 376 bits | 8 | 40 bits |
| 307200 bps | 760 bits | 8 | 40 bits |
| 614400 bps | 1528 bits | 8 | 40 bits |

TABLE 6

LTU Applied to Supplemental Channel (Rate Set 2)

| Transmission Rate | LTU Size | LTU Number | Remaining Bits |
|---|---|---|---|
| 14400 bps | — | None | — |
| 28800 bps | — | None | — |
| 57600 bps | 560 bits | 2 | 8 bits |
| 115200 bps | 568 bits | 4 | 8 bits |
| 230400 bps | 568 bits | 8 | 40 bits |
| 460800 bps | 1144 bits | 8 | 40 bits |
| 1036800 bps | 2584 bits | 8 | 40 bits |

It should be noted in Tables 5 and 6 that the LTU is not used for the first two transmission rates. That is, when the supplemental channel having such transmission rates is connected, the multiplexing/demultiplexing controllers of the transmission side and the receiving side follow the information bit processing rule.

The MuxPDU formats proposed in an embodiment of the invention to fill the information bits are shown in Tables 7 to 12 below. Tables 7 and 8 show the MuxPDU formats for the information bits of the fundamental channel (FCH). Tables 9 and 11 show the MuxPDU formats for the information bits of the supplemental channel (SCH), for the case where the LTU is used. Tables 10 and 12 show the MuxPDU formats for the information bits of the supplemental channel, for the case where the LTU is not used. As described above, the dedicated control channel is applied to a special case where only the transmission rate of 9600 bps or 1400 bps is permissible to the supplemental channel, the dedicated control channel permits only the MuxPDU format corresponding to the transmission rates of 9600 bps or 14400 bps, in Table 7 and 8 below.

TABLE 7

MuxPDU format for Information Bits of FCH (Rate Set 1)

| Tx Rate | 1st Service Data Block | Signaling Message | Service Data Block | Service Identifier | MuxPDU Header |
|---|---|---|---|---|---|
| 9600 bps | 171 bits | — | — | — | '0' |
| 9600 bps | 80 bits | 88 bits | — | — | '0001' |
| 9600 bps | 40 bits | 128 bits | — | — | '0101' |
| 9600 bps | 16 bits | 152 bits | — | — | '1001' |
| 9600 bps | — | 168 bits | — | — | '1101' |
| 9600 bps | 80 bits | — | 85 bits | 3 bits | '0011' |
| 9600 bps | 40 bits | — | 125 bits | 3 bits | '0111' |
| 9600 bps | 16 bits | — | 149 bits | 3 bits | '1011' |
| 9600 bps | — | — | 165 bits | 3 bits | '1111' |
| 4800 bps | 80 bits | — | — | — | — |
| 2700 bps | 40 bits | — | — | — | — |
| 1500 bps | 16 bits | — | — | — | — |

TABLE 8

MuxPDU format for Information Bits of FCH (Rate Set 2)

| Tx Rate | 1st Service Data Block | Signaling Message | Service Data Block | Service Identifier | MuxPDU Header |
|---|---|---|---|---|---|
| 14400 bps | 266 bits | — | — | — | '0' |
| | 124 bits | 138 bits | — | — | '00001' |
| | 54 bits | 208 bits | — | — | '00011' |
| | 20 bits | 242 bits | — | — | '00101' |
| | — | 262 bits | — | — | '00111' |
| | 124 bits | — | 135 bits | 3 bits | '01001' |
| | 54 bits | — | 205 bits | 3 bits | '01011' |
| | 20 bits | — | 239 bits | 3 bits | '01101' |
| | — | — | 259 bits | 3 bits | '01111' |
| | 20 bits | 222 bits | 17 bits | 3 bits | '10001' |
| 7200 bps | 124 bits | — | — | — | '0' |
| | 54 bits | 67 bits | — | — | '0001' |
| | 20 bits | 101 bits | — | — | '0011' |
| | — | 121 bits | — | — | '0101' |
| | 54 bits | — | 64 bits | 3 bits | '0111' |
| | 20 bits | — | 98 bits | 3 bits | '1001' |
| | — | — | 118 bits | 3 bits | '1011' |
| | 20 bits | 81 bits | 17 bits | 3 bits | '1101' |
| 3600 bps | 54 bits | — | — | — | '0' |
| | 20 bits | 32 bits | — | — | '001' |
| | — | 52 bits | — | — | '011' |
| | 20 bits | — | 29 bits | 3 bits | '101' |
| | — | — | 49 bits | 3 bits | '111' |
| 1800 bps | 20 bits | — | — | — | '0' |
| | — | — | 17 bits | 3 bits | '1' |

In Tables 7 and 8, a MuxPDU header, which has information for segmenting the data blocks included in the MuxPDU, is attached to the MuXPDU. The MuxPDU header is located at the tail of the MuxPDU to byte-arrange the data blocks.

TABLE 9

MuxPDU format for Information Bits of SCH (Rate Set 1, LTU used)

| Tx Rate | Service Identifier | Length Indicator | Length Field | Length of Service Data Block |
|---|---|---|---|---|
| 38400 bps | 3 bits | '000' | — | Max 346 bits |
| 76800 bps | 3 bits | '000' | — | Max 354 bits |
| 153600 bps | 3 bits | '000' | — | Max 354 bits |

TABLE 9-continued

MuxPDU format for Information Bits of SCH (Rate Set 1, LTU used)

| Tx Rate | Service Identifier | Length Indicator | Length Field | Length of Service Data Block |
|---|---|---|---|---|
| 307200 bps | 3 bits | '000' | — | Max 738 bits |
| 614400 bps | 3 bits | '000' | — | Max 1506 bits |
| Every Rate | 3 bits | '101' | 8 bits | Max 2034 bits |
| Every Rate | 3 bits | '110' | 16 bits | Max 524266 bits |

TABLE 10

MuxPDU format for Information Bits of SCH (Rate Set 1, LTU unused)

| Tx Rate | Service Identifier | Length Indicator | Length Field | Length of Service Data Block |
|---|---|---|---|---|
| 19200 bps | 3 bits | '000' | — | Max 354 bits |
| 38400 bps | 3 bits | '000' | — | Max 738 bits |
| 76800 bps | 3 bits | '000' | — | Max 1506 bits |
| 153600 bps | 3 bits | '000' | — | Max 3042 bits |
| 153600 bps | 3 bits | '100' | 8 bits | Max 3034 bits |
| 307200 bps | 3 bits | '000' | — | Max 6112 bits |
| 307200 bps | 3 bits | '100' | 8 bits | Max 6104 bits |
| 614400 bps | 3 bits | '000' | — | Max 12258 bits |
| 614400 bps | 3 bits | '100' | 8 bits | Max 12250 bits |
| Every Rate | 3 bits | '101' | 8 bits | Max 2034 bits |
| Every Rate | 3 bits | '110' | 16 bits | Max 524266 bits |

TABLE 11

MuxPDU format for Information Bits of SCH (Rate Set 2, LTU used)

| Tx Rate | Service Identifier | Length Indicator | Length Field | Length of Service Data Block |
|---|---|---|---|---|
| 57600 bps | 3 bits | '000' | — | Max 538 bits |
| 115200 bps | 3 bits | '000' | — | Max 546 bits |
| 230400 bps | 3 bits | '000' | — | Max 546 bits |
| 460800 bps | 3 bits | '000' | — | Max 1122 bits |
| 1036800 bps | 3 bits | '000' | — | Max 2562 bits |
| 1036800 bps | 3 bits | '100' | 8 bits | Max 2554 bits |
| Every Rate | 3 bits | '101' | 8 bits | Max 2034 bits |
| Every Rate | 3 bits | '110' | 16 bits | Max 524266 bits |

TABLE 12

MuxPDU format for Information Bits of SCH (Rate Set 2, LTU unused)

| Tx Rate | Service Identifier | Length Indicator | Length Field | Length of Service Data Block |
|---|---|---|---|---|
| 28800 bps | 3 bits | '000' | — | Max 546 bits |
| 57600 bps | 3 bits | '000' | — | Max 1122 bits |
| 115200 bps | 3 bits | '000' | — | Max 2274 bits |
| 115200 bps | 3 bits | '100' | 8 bits | Max 2266 bits |
| 230400 bps | 3 bits | '000' | — | Max 4578 bits |
| 230400 bps | 3 bits | '100' | 8 bits | Max 4570 bits |
| 460800 bps | 3 bits | '000' | — | Max 9186 bits |
| 460800 bps | 3 bits | '100' | 8 bits | Max 9178 bits |
| 1036800 bps | 3 bits | '000' | — | Max 20706 bits |
| 1036800 bps | 3 bits | '100' | 8 bits | Max 20698 bits |
| Every Rate | 3 bits | '101' | 8 bits | Max 2034 bits |
| Every Rate | 3 bits | '110' | 16 bits | Max 524266 bits |

In Tables 7 to 12, the service identifier can be defined as shown in Table 13 below.

TABLE 13

Service Identifier

| Service Identifier | Service |
|---|---|
| '000' | Reserved |
| '001' | $1^{st}$ Service |
| '010' | $2^{nd}$ Service |
| '011' | $3^{rd}$ Service |
| '100' | $4^{th}$ Service |
| '101' | $5^{th}$ Service |
| '110' | $6^{th}$ Service |
| '111' | Null Service |

In Table 13, the "null service" is a previously determined specific service identifier used to inform the multiplexing/demultiplexing controller of the receiving side that the MuxPDU is the fill MuxPDU. As can be appreciated from Table 13, the MuxPDU formats of Tables 7 to 12 can identify the data blocks provided from maximum 6 services.

Tables 7 and 8 show the MuxPDU formats transmitted on the fundamental channel. Here, the $1^{st}$ service can be identified depending on only the MuxPDU header without the service identifier, because the case where the second lowest bit of the MuxPDU header is '0' corresponds to the $1^{st}$ service. The data blocks corresponding to the $2^{nd}$ to $6^{th}$ services can be determined depending on the service identifiers of Table 7. Therefore, the service identifiers of Table 7 can have the values of '010' to '110'. When the data block of the $1^{st}$ service is filled with all 1's in the fundamental channel using the MuxPDU format of Table 7, the multiplexing/demultiplexing controller of the receiving side appoints the null traffic which does not correspond to any service in the multiplexing/demultiplexing controller of the transmission side. Therefore, when the MuxPDU received from the fundamental channel has only the data block of the $1^{st}$ service and the data block is filled with all 1's, the multiplexing/demultiplexing controller of the receiving side decides the data block is null traffic.

In Tables 7 and 8, the MuxPDU format allowed at a transmission rate of 9600 or 14400 bps may be transmitted through the DCCH, as described above. Also, the data blocks corresponding to the $2^{nd}$ to $6^{th}$ services can be determined depending on the service identifiers of Tables 7 and 8. It should be noted that the DCCH does not require null traffic. Among the MuxPDU formats allowed at a transmission rate of 9600 or 14400 bps in Tables 7 and 8, the MuxPDU format containing a single service data block but not the signaling message is transmittable with the SCH connected at 9600 or 14400 bps.

Tables 9 to 12 shows the MuxPDU format with the SCH connected at a transmission rate of 19200, 28800, or more. The data blocks corresponding to the $1^{st}$ to $6^{th}$ services can be determined depending on the service identifiers of Tables 9 to 12, which may have values from '001' to '110'. In this case, the MuxPDU format includes the service block of a length determined according to each transmission rate of these Tables if the length indicator is '000'. Also, if the length indicator is '100', '101', or '110' in these tables, the size of the MuxPDU may be calculated by the length field. Namely, if the length indicator is '100', the length of the service block is obtained by subtracting the value of the length field multiplied by 8 from the length corresponding to each transmission rate. For example, if the length indicator of the MuxPDU received through the SCH connected at 614400 bps without using LTUs is '100', and the value of the length field is '00000010', the length of the service block contained in the MuxPDU is calculated by subtracting the product of 2×8 bits from 12250 bits of Table 10, i.e., 12234 bits. In addition, if the length indicator is '101' or '110' in Tables 9 to 12, the length of the service block contained in the MuxPDU is calculated by subtracting the MuxPDU header size in bits from the value obtained by multiplying the sum of 1 and the value of the length field by 8. Namely, if the length indicator of the MuxPDU received through the SCH connected at 614400 bps without using the LTU is '110'(=$6_{10}$), and the value of the length field '0000 0101 1111 1001' (=$1529_{10}$), the length of the service block contained in the MuxPDU is calculated by subtracting the MuxPDU header size 6 bits from the value obtained by multiplying the sum of 1 and the decimal value 1529 of the length field by 8, i.e., ((1+1529)*8)−6=12234.

2. Tx Operation of the Multiplexing/Demultiplexing Controller on the FCH

Figure 9:
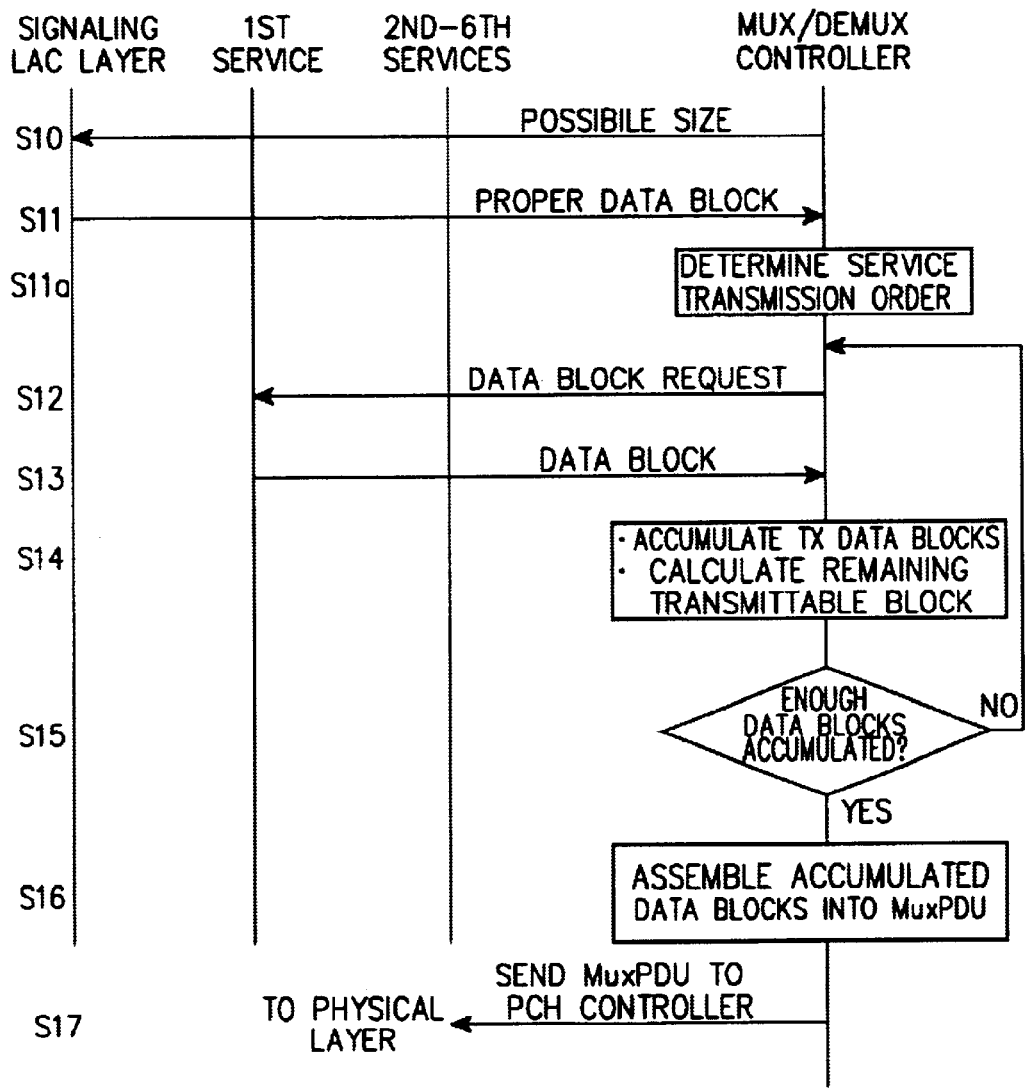
FIG. 9 is a flow diagram illustrating a procedure for transmitting the fundamental channel according to an embodiment of the present invention.

Assuming that the 6 services using the RLP are connected, the multiplexing/demultiplexing controller of the transmission side operates as follows. This operation is performed according to the procedure shown in FIG. 9.

First, the multiplexing/demultiplexing controller 140 of FIG. 3 determines the transmitting order of the services and the size of the data blocks according to a QoS (Quality of Service) guarantee rule. That is, the multiplexing/demultiplexing controller inquires of a signaling LAC (Link Access Control) layer about a possible size (Step S10 of FIG. 9), and receives information about a proper size for the data block from the signaling LAC layer (Step S11). The multiplexing/demultiplexing controller determines the order of transmitting the services (Step S11a), requests the $1^{st}$ service to provide a data block of the determined size (Step S12), and receives the data block within or equal to the determined size from the $1^{st}$ service (Step S13). For a data block to be transmitted to the fundamental channel, the RLP processor should be requested to generate the data block of a proper size according to the size and number of the data blocks that the MuxPDU permits in Table 7 or 8, and a combination of them. It should be noted that not only the RLP processor but also a plurality of protocols can be the $1^{st}$ service. Thereafter, the multiplexing/demultiplexing controller accumulates the data blocks to be transmitted and calculates the remaining blocks which can be transmitted (Step S14). Next, the multiplexing/demultiplexing controller determines whether or not it is possible to assemble the MuxPDU using the accumulated data blocks (Step S15). If it is not possible to assemble the MuxPDU, the multiplexing/demultiplexing controller returns to step S12 to request the corresponding service to provide the data block, and is provided with the requested data block. Otherwise, if it is possible to assemble the MuxPDU, the multiplexing/demultiplexing controller assembles the MuxPDU using the accumulated data blocks (Step S16). The multiplexing/demultiplexing controller selects a proper bit pattern from Table 4 and attaches the selected bit pattern to the MuxPDU header. The multiplexing/demultiplexing controller transmits the generated MuxPDU to the physical channel in the information bits (Step S17).

For the RLP processor which has failed to generate a data block in the above process, the multiplexing/demultiplexing controller requests the RLP processor to generate a blank data block so as to enable the RLP processor to know the fact that it has failed to have the opportunity. In addition, if every RLP processor has provided no data block in the above process, the multiplexing/demultiplexing controller assembles the null traffic and transmits it as the information bits to the physical channel.

3. Rx Operation of the Multiplexing/Demultiplexing Controller on the FCH

Figure 10:
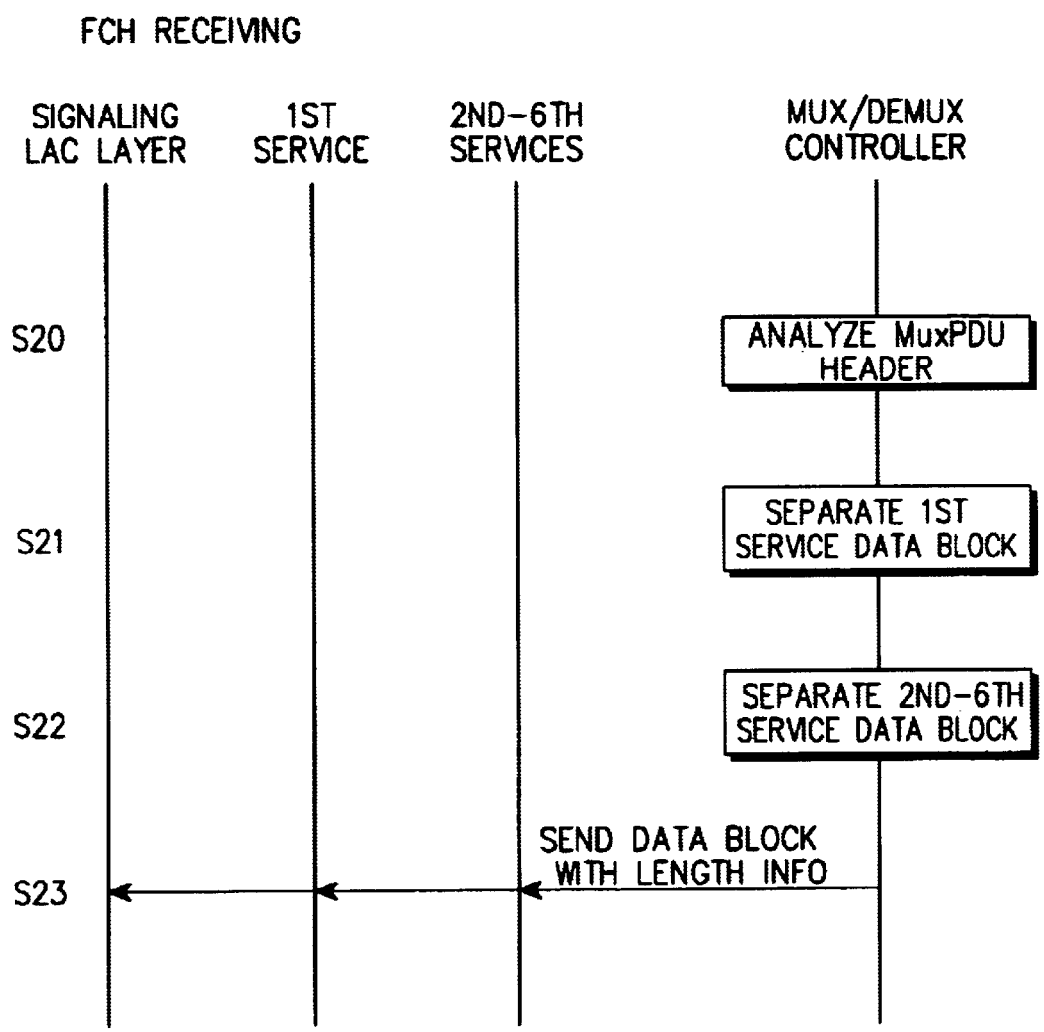
FIG. 10 is a flow diagram illustrating a procedure for receiving the fundamental channel according to an embodiment of the present invention.

The multiplexing/demultiplexing controller of the receiving side operates as follows with respect to the information bits transmitted over the fundamental channel. This operation is performed according to the procedure shown in FIG. 10. The multiplexing/demultiplexing controller analyzes the transmission rate and the MuxPDU header of the received information (Step S20 of FIG. 10), and distinguishes the data blocks (Steps S21 and S22) based on the analysis. To distinguish the data blocks, reference should be made to Tables 7 and 8 according to the Rate Sets. If the last 1 bit of the received information bits is set to '0', all the information bits other than the last 1 bit constitute a data block of the first service, so that it is transmitted to the first service together with the length information of the data block (Step S23).

Otherwise, when the last 1 bit of the received information bits is set to '1' in the above process, the multiplexing/demultiplexing controller of the receiving side regards the last 4 bits as the MuxPDU for the Rate Set 1 and regards the last 5 bits as the MuxPDU for the Rate Set 2. A combination having a bit pattern of the MuxPDU is searched from Table 7 or 8. If there is no combination having the same bit pattern, the multiplexing/demultiplexing controller of the receiving side considers the received information bits as damaged bits. Otherwise, if there exists a combination having the same bit pattern, the multiplexing/demultiplexing controller separates the data block and the service identifier according to the size and position of the data block specified in Table 7 or 8. For example, for the Rate Set 1 if the information bits are received at 9600 bps and the MuxPDU header is '0011', the first 80 bits of the received MuxPDU constitute a data block of the first service, the next 85 bits constitute a data block of another service, and the remaining 3 bits is the service identifier. The service identifier may not exist according to the combinations, as specified in Table 7 or 8.

The data block separated in the above process is transmitted to the corresponding service with reference to Table 7 or 8. It is possible to transmit the data block to the first service and the signaling layer together with the length information of the data block, without analyzing the service identifier. However, if the service identifier is analyzed, the service identifier is compared with Table 13 to transmit the data block to the corresponding service together with the length information of the data block. In this example, the multiplexing/demultiplexing controller of the receiving side transmits the 80-bit data block to the first service together with its length information, and transmits the following 85-bit data blocks to the services indicated by the service identifiers together with each length information. If the service identifier's value is set to '000', '001' or '111', the multiplexing/demultiplexing controller of the receiving side considers the received information bits as damaged bits. If the received information bits are damaged bits, the multiplexing/demultiplexing controller informs all the services which have a logical channel on the fundamental channel, that a damaged data block has been received, and also informs the services of the maximum length of the data block at which the respective services can transmit. For example, for the MuxPDU format of Table 7 used at the Rate Set 1, 171 bits are transmitted to the first service, and 165 bits are transmitted to the second to sixth services.

Otherwise, if the information bits are not damaged, there is only one data block and the data block corresponding to the first service is filled with all 1's, then the multiplexing/demultiplexing controller of the receiving side discards the information bits, regarding them as null traffic, and informs all the services, which have a logical channel on the fundamental channel, that no data block is received. When the information bits are not damaged, and one or more services of the services which have logical channels on the fundamental channel receive no data blocks, the multiplexing/demultiplexing controller of the receiving side informs those services that a null data block is received. It should be noted that for the null traffic, informing receipt of no data block and informing receipt of a null data block may have different meanings according to the service.

4. Tx Operation of Multiplexing/Demultiplexing Controller on the SCH

When generating the information bits for the supplemental channel, the multiplexing/demultiplexing controller generates as many LTUs as the number shown in Table 5 or 6 according to the transmission rate. The LTU has the size shown in Table 5 or 6. Since the LTU has a 16-bit CRC, the maximum size of the MuxPDU which can be actually transmitted over the LTU is calculated by subtracting 16 bits from the size shown in Table 5 or 6 according to the transmission rates.

For example, when a supplemental channel of 307.2 Kbps is used and the LTU is generated, the payload of the LTU includes the MuxPDU, so that the maximum size of the MuxPDU is 744 bits (as determined by subtracting 16 CRC bits from 760 bits of the LTU payload). When the multiplexing/demultiplexing controller generates the LTU while generating the information bits of the supplemental channel, the possible MuxPDU format according to the Rate Sets are shown in Tables 9 and 11. If the multiplexing/demultiplexing controller generates the MuxPDU to fill up the LTU payload, the multiplexing/demultiplexing controller generates a 16-bit CRC for the LTU payload. The 16-bit CRC is generated in the same manner as a 16-bit CRC generating method which is applied to the supplemental channel. In this manner, the multiplexing/demultiplexing controller generates as many LTUs as the number specified in Table 5 or 6, sequentially puts them in the information bits, and then fills the remaining portion with 0's before transmission to the physical layer processor.

If LTUs are not generated when generating the information bits of the supplemental channel, the multiplexing/demultiplexing controller generates the information bits of a size designated in Table 3 or 4 according to the transmission rate. In this case, for a transmission rate of 9600 bps or 14400 bps, only one MuxPDU having a single service data block specified in Tables 7 and 8 can be transmitted.

If LTUs are not generated when generating the information bits of the supplemental channel, the multiplexing/demultiplexing controller can use the MuxPDU formats of Tables 10 and 12 for the transmission rate of 19200 bps or 28800 bps or more. The multiplexing/demultiplexing controller generates the MuxPDU to fill the information bits, and transfers the generated MuxPDU to the physical layer controller.

Figure 11:
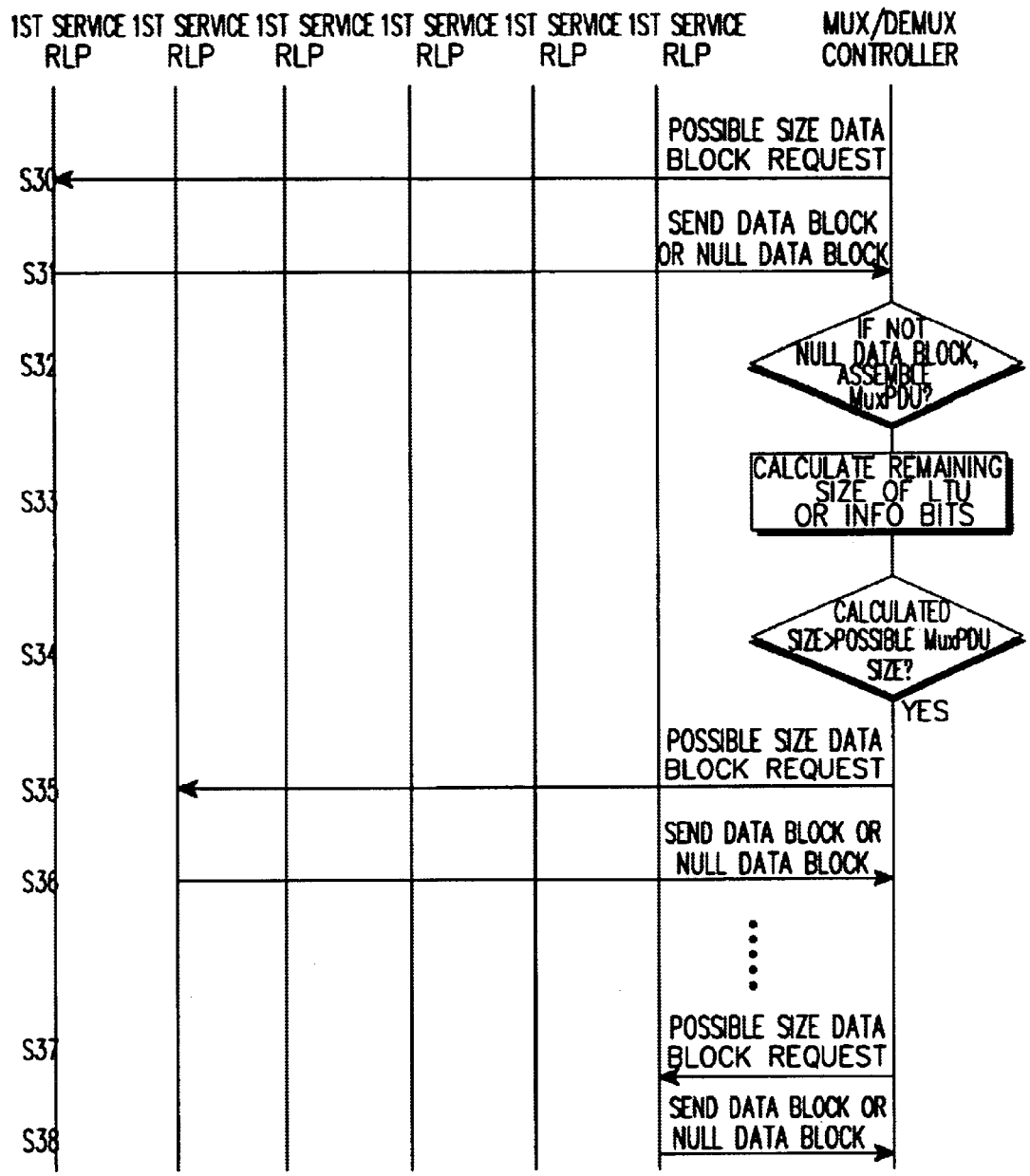
FIG. 11 is a flow diagram illustrating a procedure for transmitting the supplemental channel according to an embodiment of the present invention.

The operation of transmitting on the supplemental channel is performed according to the procedure shown in FIG. 11. The multiplexing/demultiplexing controller determines the order of transmitting the services and the size of the data blocks according to the QoS guarantee rule. Next, the multiplexing/demultiplexing controller sends a data block request to the RLP of the respective services according to the priority order (Step S30 of FIG. 11). That is, the multiplexing/demultiplexing controller sends a possible data block request to the RLP processor of the first service having the top priority (Step S30), and receives a corresponding data block or a null data block from the RLP processor of the first service (Step S31). Upon receipt of the data block rather than the null data block, the multiplexing/demultiplexing controller generates the MuxPDU using the received data block (Step S32). The generated MuxPDU is finally assembled into the information bits.

If LTUs are generated when generating the information bits of the supplemental channel, the multiplexing/demultiplexing controller should request the RLP processor to generate a data block of proper size according to the size of the data block permitted by the MuxPDU in Table 9 or 11 and the remaining portion of the LTU which is presently being generated. That is, upon receipt of the data block, the multiplexing/demultiplexing controller calculates the size of the LTU or the remaining portion of the information bits (Step S33), and determines whether the calculated size is larger than or equal to the possible size of the MuxPDU (Step S34). If the calculated size is larger than or equal to the possible size of the MuxPDU, the multiplexing/demultiplexing controller sends a request for the data block of the possible size to the RLP processor of the second service having the next top priority (Step S35), and receives a corresponding data block or a null data block from the RLP processor of the second service (Step S36). This operation is repeatedly performed on the RLP processors of all the services. Steps S33–S36 also apply when LTUs are not generated.

If LTUs are not generated when generating the information bits of the supplemental channel, the multiplexing/demultiplexing controller requests the respective services to generate a data block which can be transmitted to the supplemental channel specified in Tables 7 and 8 according to the priority order for the transmission rate of 9600 bps or 14400 bps, in order to generate one MuxPDU format which can be transmitted to the supplemental channel, out of the MuxPDU formats specified in Tables 7 and 8. If any one of the services generates a data block, the multiplexing/demultiplexing controller assembles this into the MuxDU.

For the transmission rate of 19200 bps or 28800 bps, if LTUs are not generated when generating the information bits of the supplemental channel, the multiplexing/demultiplexing controller should request the RLP processor to generate a data block of proper size according to the data block size permitted by the MuxPDU in Table 10 or 12 and the remaining portion of the LTU which is presently generated (Steps S32 to S38).

If the multiplexing/demultiplexing controller fills the LTU payload or the information bits while generating the information bits of the supplemental channel, the multiplexing/demultiplexing controller should know the LTU payload which is not yet filled and the length of the remaining portion of the information bits. The multiplexing/demultiplexing controller requests the services to generate a data block for the remaining portion. If a data block which is not a null data block is received from a certain service, the multiplexing/demultiplexing controller operates according to the length of this data block, as follows.

1. If the length of the received data block is shorter by 4 bits than the LTU payload or the remaining portion of the information bits, the multiplexing/demultiplexing controller assembles the MuxPDU by attaching a 3-bit service identifier and a length indicator set to '0' at the head of the data block according to the service from which the data block is received, based on Table 13. The multiplexing/demultiplexing controller puts the generated MuxPDU in the LTU payload or the remaining portion of the information bits thereby to complete the LTU payload or the information bits.

2. If the length of the received data block is shorter by 14 bits or more than the LTU payload or the remaining portion of the information bits, the multiplexing/demultiplexing controller generates the MuxPDU having 8 or 16 bits specified in Tables 9 to 12. Namely, if the generated data block is equal to or less than 2034 bits, the multiplexing/demultiplexing controller assembles the MuxPDU by attaching a 3-bit service identifier based on Table 13, and setting the 3-bit length indicator to '101', and the 8 bits of the length field are set by subtracting 1 from the whole length in bytes of the MuxPDU consisting of the service identifier, length indicator, length type field, length field, and data block. If the generated data block is greater than 2034 bits, it assembles the MuxPDU by attaching a 3-bit service identifier based on Table 13, and setting the 3-bit length indicator to '110', and the 16 bits of the length field are set by subtracting 1 from the whole length in bytes of the MuxPDU consisting of the service identifier, length indicator, length type field, length field, and data block. The multiplexing/demultiplexing controller may generate a MuxPDU having the length indicator set to '100' by using the 8-bit length field specified in Tables 9 to 12. Namely, the MuxPDU may be generated by including the 8-bit field length representing in bytes the difference in size between the data block to be transmitted and the maximum size of the data block specified in Tables 9 to 12. In this case, if the size of the generated MuxPDU is not a natural number, represented not in bytes, the multiplexing/demultiplexing controller discards the data block. However, if it is a natural number, it assembles the MuxPDU by attaching the service identifier, length indicator, length type, and length field at the head of the data block. The multiplexing/demultiplexing controller puts the generated MuxPDU in the LTU payload or the remaining portion of the information bits.

The above process is repeatedly performed on the portion remaining after sequentially putting the generated MuxPDU in the payload of the LTU. In the process, if there, is no more data blocks of proper size, the multiplexing/demultiplexing controller fills the first 4 bits in the remaining portion by setting the service identifier to '111' and the length indicator to '0', and then sets the remaining portion to all 0's, thereby filling the LTU payload or the information bits.

In the case where LTUs are generated, if as many LTUs are generated as the number specified in Table 5 or 6, the multiplexing/demultiplexing controller sequentially puts all the generated LTUs in the information bits. The multiplexing/demultiplexing controller fills the remaining portion with all 0's as shown in Table 5 or 6, and transmits it to the physical channel processor.

In the case where LTUs are not generated, if the information bits specified in Table 3 or 4 are all filled in the above process, the multiplexing/demultiplexing controller transmits it to the physical layer processor.

Figure 6A:
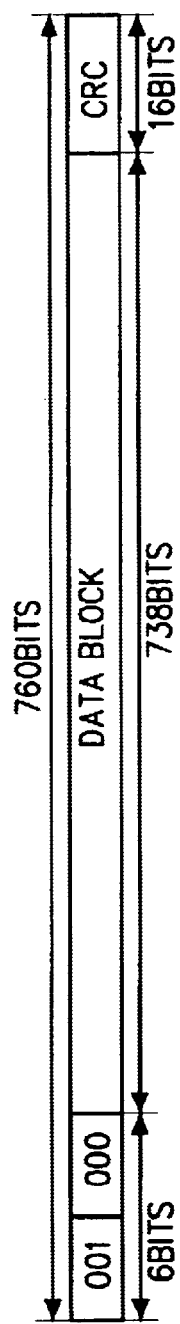
FIGS. 6A to 6C are diagrams illustrating a format of the LTU (Logical Transmission Unit) generated according to an embodiment of the present invention.
Figure 6B:
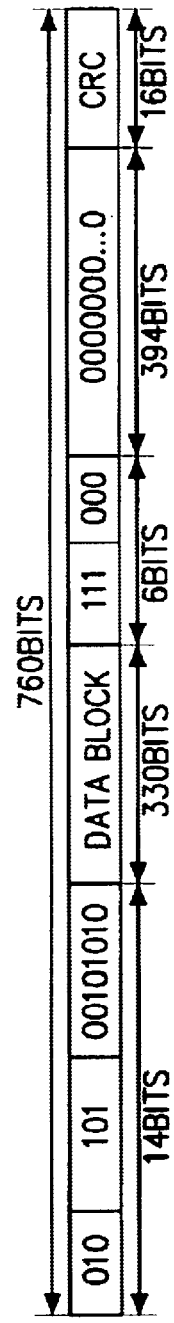
Figure 6C:
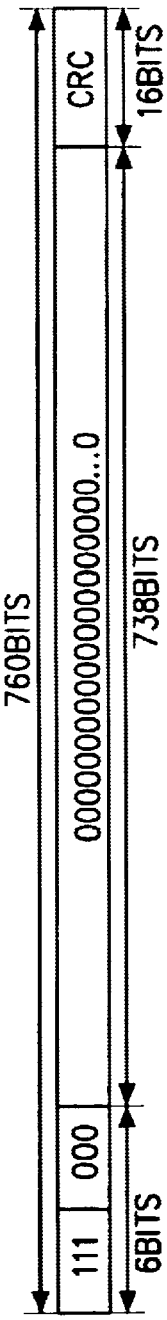

The information bits which can be obtained through the above process are shown in FIGS. 6A to 6C wherein are shown 3 LTUs, by way of example.

Referring to FIG. 6A, the first LTU corresponds to a case where a 738-bit data block is received from the first service, and is shorter than the LTU payload by 6 bits exactly, so that the service identifier is set to the first service '001', the length indicator is set to '000' and then the payload of the LTU is filled with the received data block.

Referring to FIG. 6B, the second LTU corresponds to a case where a 330-bit data block is received from the second service, and is shorter by over 14 bits than the remaining LTU payload and shorter than 2034 bits, so that the service identifier is set to the second service '010', the length indicator is set to '101', and then the length field is set to a value '0010 1010' determined by subtracting one from 43 bytes which is the total length of the MuxPDU. The LTU payload portion of the remaining 50 bytes corresponds to a case where no data block is received from the services. In this case, the fill MuxPDU is generated and put in this portion. Referring to FIG. 6C, the third LTU corresponds to a case where no data block is provided from the services when generating the LTU. In this case, the fill MuxPDU is generated and put in the LTU. By filling the information bits with the LTUs shown in FIGS. 6A to 6C and setting the remaining bits to '000', generation of the information bits is completed.

5. Rx Operation of the Multiplexing/Demultiplexing Controller on the SCH

Figure 12:
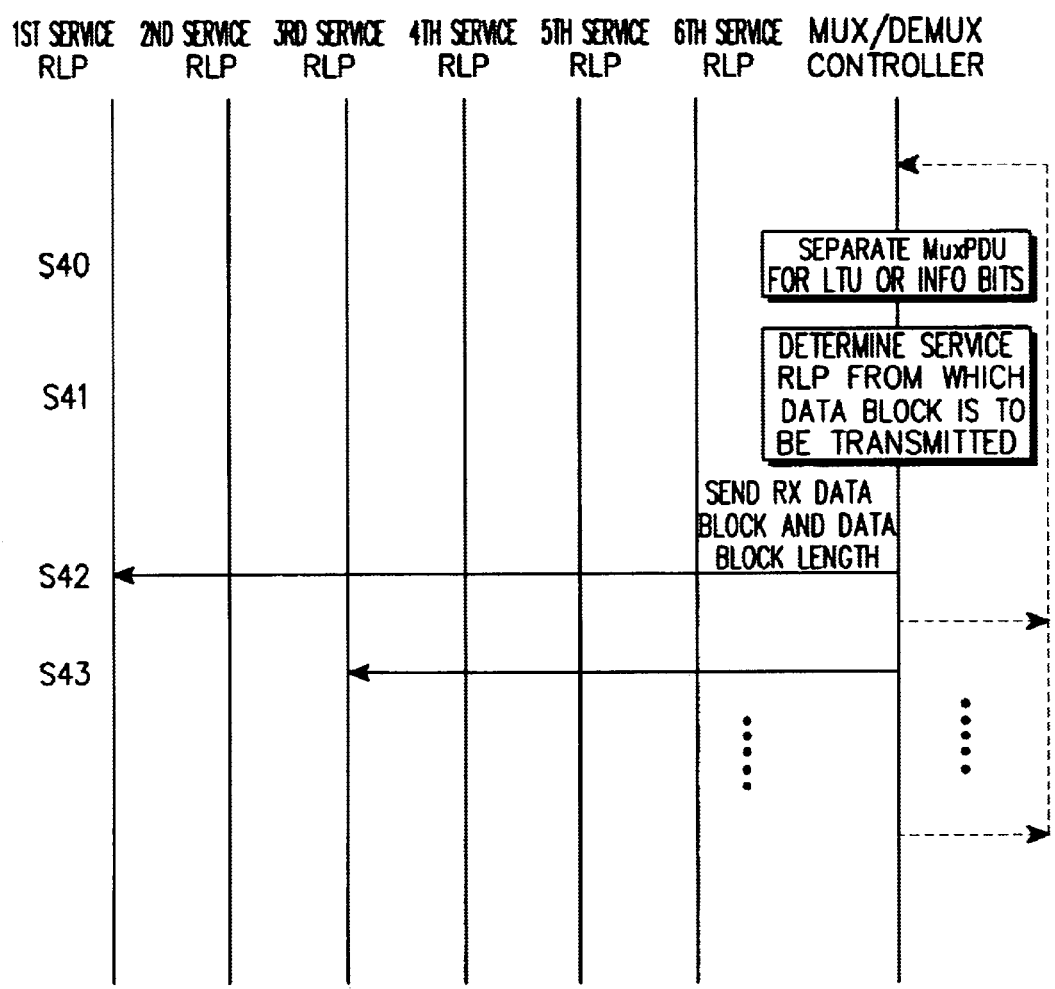
FIG. 12 is a flow diagram illustrating a procedure for receiving the supplemental channel according to an embodiment of the present invention.

The multiplexing/demultiplexing controller of the receiving side operates as follows for the information bits transmitted over the supplemental channel. This operation is performed according to the procedure shown in FIG. 12.

For the information bits using LTUs, the LTU is divided according to the transmission rate as shown in Table 5 or 6. For example, for information bits received over the supplemental channel connected at 307.2 Kbps, the LTU's segmented into a unit of 760 bits as shown in Table 5. If the CRC check shows no errors in the information bits, the multiplexing/demultiplexing controller separates the MuxPDU from each LTU or information bits (Step S40 of FIG. 12). After separating the MuxPDU, the multiplexing/demultiplexing controller determines the RLP of a service to which the data block will be transmitted (Step S41), and transmits the received data block to the RLP of the corresponding service. At this point, the length information of the data block is transmitted together with the received data block (Steps S42 and S43). This operation of transmitting the received data block and the length information of the data block to the RLP of the corresponding service is performed on every separated MuxPDU.

Otherwise, if the information bits have errors, the multiplexing/demultiplexing controller performs CRC checking on each individual LTU. For the error-free LTUs, the multiplexing/demultiplexing controller separates out the MuxPDU. However, for the LTUs having errors, the multiplexing/demultiplexing controller informs all the services which have a logical channel on the supplemental channel, that a damaged data block is received, and also informs those services of the maximum length of the data block that the respective services can transmit in a LTU, and then discards the information bits. For example, the maximum length of the data block to be transmitted in a LTU that was received over the supplemental channel connected at 307.2 Kbps, is 740 bits as shown in FIGS. 6A to 6C.

For the information bits received which were not generated using LTUs, the MuxPDU is separated according to Table 7 or 8 for the transmission rate of 9600 bps or 14400 bps. The MuxPDU separating method is performed in the same manner as in the fundamental channel. However, in the supplemental channel, since only one data block received from the service which has a logical channel corresponds on the supplemental channel can exist in the MuxPDU, the information bits having a different MuxPDU are considered to be damaged.

For the information bits received which were not generated using LTUs, the MuxPDU is separated over the whole information bits for the transmission rate of 19200 bps or 28800 bps. If the information bits have errors, the multiplexing/demultiplexing controller informs all the services, which have a logical channel on the supplemental channel, that a damaged data block is received, and also informs those services of the maximum length of a data block that the respective services can transmit on a LTU, as shown in Table 10 or 12, and then discards the information bits. For example, the maximum length of the data block to be transmitted in a LTU, which was received over the supplemental channel connected at 307.2 Kbps, is 6116 bits as shown in Table 10.

When separating the MuxPDU for the LTU payload or information bits, it is possible to know to which service the data block that the MuxPDU has should be transmitted, depending on the service identifier, the length indicator and the length field, and to know the total length of the received MuxPDU, as follows:

1. The multiplexing/demultiplexing controller of the receiving side begins MuxPDU separation at the head of the LTU payload or the information bits.

2. If the service identifier of the MuxPDU, which is now being analyzed, is set to '111' as shown in Table 13, the multiplexing/demultiplexing controller of the receiving side discards all the remaining portion of the LTU payload or the information bits.

3. If the service identifier of the MuxPDU, which is now being analyzed, is set to '000' as shown in Table 13, the multiplexing/demultiplexing controller of the receiving side considers the LTU payload or the information bits to be damaged.

4. If the service identifier of the MuxPDU, which is now being analyzed, is set to a value between '001' and '110', which indicates one of the services which have a logic channel on the supplemental channel, the next 1-bit length indicator will be analyzed. If the service identifier does not indicate one of the services which have a logic channel on the supplemental channel, the multiplexing/demultiplexing controller will consider the LTU payload or the information bits to be damaged.

5. If the 3-bit length indicator is set to '000', the remaining portion of the LTU payload or the information bits constitutes one MuxPDU. Therefore, a data block from the MuxPDU having a length determined by subtracting 6 bits from the remaining portions length is transmitted to the upper service.

6. If the 3-bit length indicator is set to '100', '101', or '110, the next length field will be analyzed. If the 3-bit length type field is not set to '000', '100', '101', or '110, the multiplexing/demultiplexing controller of the receiving side will consider the LTU payload or the information bits as damaged.

7. If the 3-bit length type field is set to '100', an MuxPDU is determined by subtracting the product of 8-bit length field value multiplied by 8 from the maximum size of the MuxPDU that may be contained in the LTU payload or information bits. Therefore, the remaining part obtained by subtracting the 14-bit header from the MuPDU constitutes the data block transmitted with length information to the upper service.

8. If the 3-bit length type field is set to '101' or '110', the next 8- or 16-bit length field will be analyzed. If a value determined by adding 1 to the 8-bit length is larger than a value determined by expressing in bytes the length of the remaining portion of the LTU payload or the information bits, the multiplexing/demultiplexing controller of the receiving side will consider the LTU payload or the information bits as damaged.

9. If the value determined by adding 1 to the 8-bit length field is smaller than or equal to the value expressing in bytes the length of the remaining portion of the LTU payload or the information bits, the determined value is the length of the MuxPDU. Therefore, the remaining portion, which is determined by subtracting the first 14 or 22 bits of the header from the MuxPDU having a length value determined in the remaining portion of the LTU payload or the information bits, is transmitted to the upper service together with its length information.

10. If there exists a remaining portion of the LTU payload or the information bits after determining the MuxPDU, the above process will be performed again on the remaining portion.

Hereinafter, the Tx operation of the RLP controller 131 as shown in FIGS. 3 and 4 is described.

C. Tx/Rx Operation of the RLP Controller According to an Embodiment of the Invention The RLP controller 131 generates an RLP frame with a length adapted for the size of each data block demanded by the multiplexing/demultiplexing controller 140. If there is no real data block, a dummy data block is transmitted. Namely, when the multiplexing/demultiplexing controller 140 demands a data block, it generates the RLP frame for transmitting the data stored in the transmission data buffer 122. The RLP controller 131 assigns a sequence number to each RLP frame so as to retransmit the correct part of the data transmitted when the receiving RLP controller demands a retransmission. Since the RLP frames are continuously assigned with respective sequence numbers, the receiving RLP controller can detect whether any RLP frames are lost between two adjacent RLP frames by the lost sequence numbers.

In addition, the RLP controller 131 generates a retransmission entry consisting of the sequence number of each RLP frame and the data transmitted by the RLP frame. The retransmission entries are stored in the retransmission buffer 133, which delivers a retransmission entry identified by a sequence number specified by a receiving RLP controller, which has demanded that the sending RLP controller 131 generate a retransmission RLP frame for retransmitting data. Of course, the retransmission RLP is assigned with the same sequence number as stored in the retransmission entry. In addition, the transmitting RLP controller 131 sets the retransmission indicator as '1' to inform the receiving RLP controller of the retransmitted RLP frame.

If the size of the data part to be retransmitted is greater than that of the data block demanded by the multiplexing/demultiplexing controller 140, the RLP controller 131 further segments the data part into smaller parts, which are respectively contained in the successive RLP frames. For example, if the multiplexing/demultiplexing controller 140 demands a data block with a size of 43 bytes, and the retransmitted data part has a size of 91 bytes, the RLP controller 131 generates three total RLP frames containing 43 bytes, 43 bytes, and 5 bytes, respectively.

The sending RLP controller 131 assigns a sequence number to each byte of the retransmitted data part in order that the receiving RLP controller can correctly assemble the segmented data frames. Namely, when generating segmented RLP frames containing the segments of the data part, the RLP controller 131 respectively assigns sequence numbers to all bytes of the data part. The byte sequence numbers increase one by one starting from '0' so that the last byte is assigned with the sequence number 'N−1' for total 'N' bytes. The sending and receiving RLP controllers use the sequence numbers to distinguish the data part for retransmission. Namely, if the receiving RLP controller demands the data part designated by the frame sequence number 'S' and data sequence numbers from 'i' to 'j', the sending RLP controller retransmits the data part numbered from 'i+1' to 'j+1' in the frame numbered 'S', loaded in the segmented frames.

The receiving RLP controller 131 checks the type of each data block whenever one is transmitted from the multiplexing/demultiplexing controller 140. If the received data block is a RLP frame containing new data, the RLP controller 131 checks the sequence number of the received RLP frame. If the sequence number is continuous with the sequence number of the previous RLP frame, no RLP frame is missing. If not, the receiving RLP controller 131 requests the sending RLP controller to retransmit the lost RLP frame(s) while storing the received RLP frame into the rearrange buffer 138 in order to sequentially rearrange data.

If the received data block is a retransmitted RLP frame, the RLP controller 131 determines whether its sequence number has the first priority. If so, it is assumed that all the subsequent data parts have been received, and therefore, the data parts are sequentially arranged, and transferred to the reception data buffer 124. If not, the RLP controller 131 temporarily stores the data part with its sequence number in the rearrange buffer 138, which will later sequentially transfer the rearranged data to the reception data buffer 124 when the final missing data part, with the first priority, arrives.

If the retransmitted data block is a segmented RLP frame, the RLP controller 131 checks the data sequence number to determine the position of the data part contained in the segmented RLP frame based on the data sequence number. Then, the RLP controller 131 stores its data segment, frame sequence number, and data sequence number into the rearrange buffer 138. Thus, if the retransmitted data block is the missing data part of the first priority, it is assumed that all of the successive data parts are received, so that they are sequentially arranged, and delivered to the reception data buffer 124. However, if not so, the RLP controller stores the data part of the retransmitted RLP frame with its sequence number in the rearrange buffer 138.

Completing the process of all the received data blocks, the RLP controller 131 adjusts the timer for the retransmission demand. Namely, if the received data block belongs to a new RLP frame, or there is no data frame received from the sending RLP controller, the receiving RLP controller 131 requests again the sending RLP controller to retransmit the missing data block. When the value of the timer becomes '0' waiting for the retransmission, the RLP controller 131 requests again the retransmission, or delivers only the data parts presently received to the reception data buffer 124.

1. Operation of the RLP Controller before Data Transmission

Before starting operation, the RLP controller 131 initializes the L_V(S) register 132, the L_V(N) register 135, the L_V(R) register 136 and the E register 134, shown in FIGS. 3 and 4, to '0'. Before starting operation, the RLP controller 131 empties the forward resequencing buffer 133, the NAK list 137 and the rearrange buffer 138. Further, before starting operation, the RLP controller 131 initializes to '0' the L_V(RET) register 143, V(SEG) register 139, P(SEG) register 141, and LEN register 142. Finally, the RLP controller 131 deactivates all the retransmission-related timers.

Figure 7A:
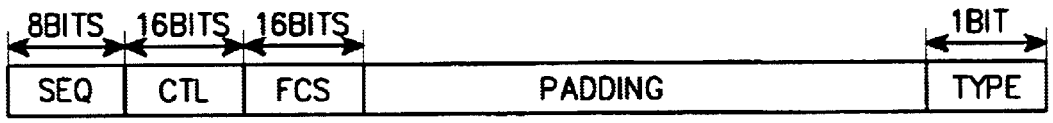
FIGS. 7A to 7G are diagrams illustrating various frame formats used when an RLP frame generated according to an embodiment of the present invention is transmitted and received over the fundamental channel.
Figure 7B:
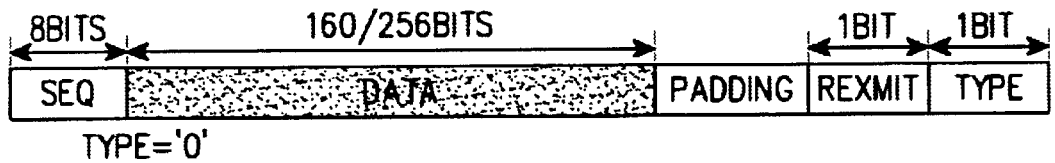
Figure 7C:
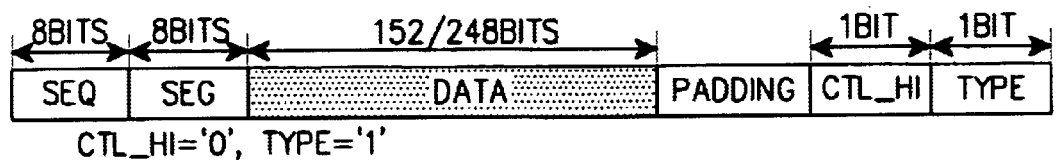
Figure 7D:
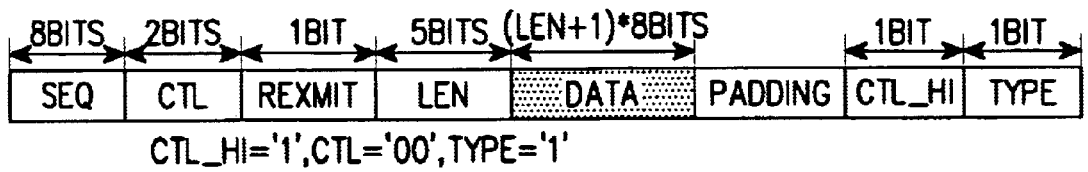
Figure 7E:
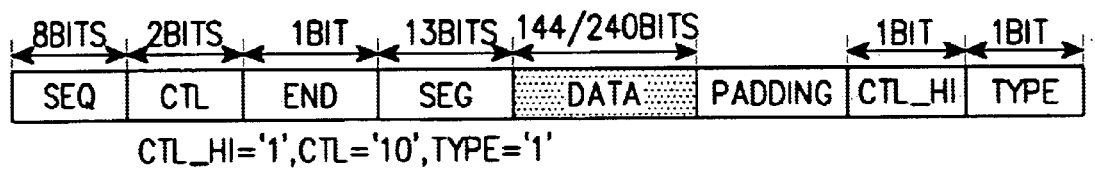
Figure 7F:
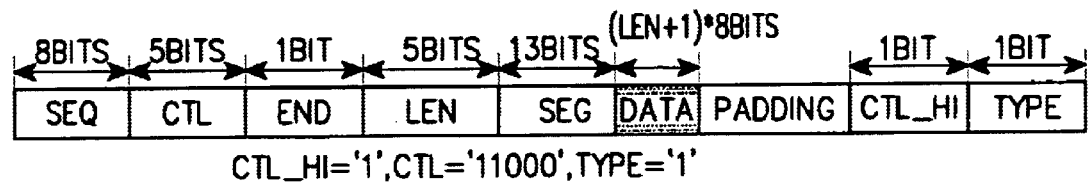
Figure 8A:
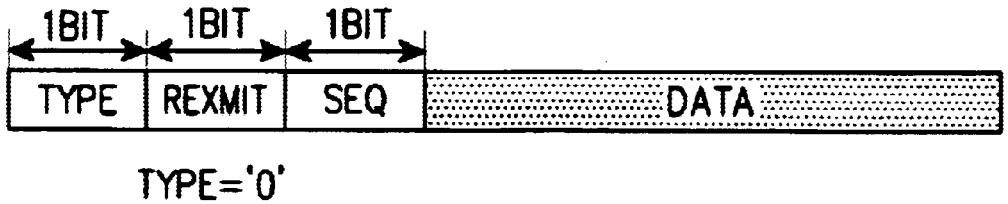
FIGS. 8A to 8C are diagrams illustrating various frame formats used when the RLP frame generated according to an embodiment of the present invention is transmitted and received over the supplemental channel.
Figure 8B:
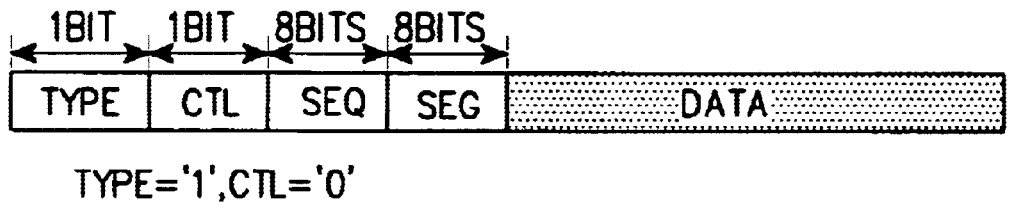
Figure 8C:
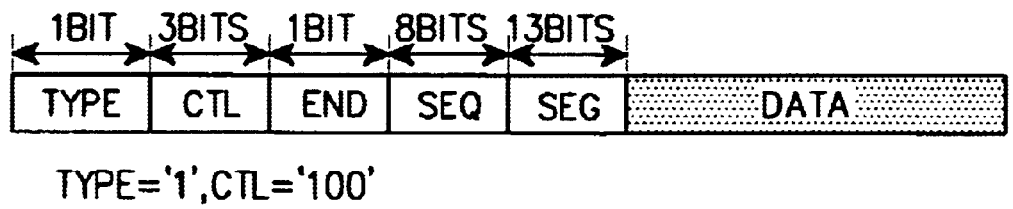

The types of the data blocks (or RLP blocks) that the RLP controller 131 can transmit to the multiplexing/demultiplexing controller are shown in FIGS. 7A to 7F and FIGS. 8A to 8C. More specifically, FIGS. 7A to 7F show the RLP frames which can be transmitted over the fundamental channel, and FIGS. 8A to 8C show RLP frames which can be transmitted over the supplemental channel. In the description below, the RLP frames will be referred to as follows. The SYNC, SYNC/ACK, ACK or NAK frame shown in FIGS. 7A to 7F or Table 14 below will be referred to as a "control frame", and a frame filled with data will be referred to as a "data frame". The data frame is divided into a new data frame filled with new transmission data of at least one byte and a retransmitted data frame filled with retransmission data only. A frame having only a 8-bit SEQ field will be referred to as an "idle frame", which is different from the control and data frames.

In FIGS. 7A to 7F, a control frame, data frame or idle frame is available for a data block transmitted over the fundamental channel. FIGS. 7A to 7F show various frames included in the data block which can be transmitted over the fundamental channel. The term "fundicated" in FIGS. 7B through 7F is a compound word formed from "fundamental" and "dedicated". More specifically, FIG. 7A shows a format of control frames (SYNC, SYNC/ACK and ACK frames). FIGS. 7B to 7D show several formats of a data frame. FIG. 7E shows a format of an idle frame. FIG. 7F shows a format of a status synchronization frame.

Referring to FIG. 7A, the control frame is comprised of a 8-bit CTL field and a 16-bit FCS field which are located at the head of the frame, and a-bit TYPE field located at the end of the frame. The CTL field is filled with '11100001' for the SYNC frame, filled with '11110010' for the SYNC/ACK frame and filled with '11110011' for the ACK frame. At this point, the TYPE field is filled with '0'.

FIG. 7B shows a format of a data frame corresponding to a case where a data frame is transmitted in a block sequence numbering method. FIGS. 7C and 7D show a format of a data frame corresponding to a case where the data frame cannot be transmitted in the block sequence numbering method. Whether or not the data frame is transmitted in the block sequence numbering method can be determined depending on the value of the TYPE field located at the end of each data frame. As shown in FIG. 7B, when the data frame is transmitted using the block sequence numbering method, the TYPE field is filled with '1'. As shown in FIGS. 7C and 7D, when the data frame is transmitted without using the block sequence numbering method, the TYPE field is filled with '0'.

Referring to FIG. 7B, the data frame is comprised of a SEQ field, a DATA field, a PADDING field, a SEQ_HI field and a TYPE field. For example, the SEQ field is comprised of 8 bits, the DATA field of 160/256 bits, the SEQ_HI field of 1 bit, and the TYPE field of 1 bit. Although the number of the transmission data bits filled in the DATA field is 160 for the Rate Set I and 256 for the Rate Set 2, the fields filled with a sequence number indicating the transmission data, i.e., the SEQ field and the SEQ_HI field can be comprised of 9 bits. This is because the sequence number is not assigned to the transmission data in a byte unit, but assigned to the transmission data in a block unit corresponding to a multiple of a byte unit sequence number.

Referring to FIG. 7C, the data frame is comprised of a CTL field, a LEN field, a SEQ field, a DATA field, a PADDING field, a SEQ_HI field and a TYPE field. For example, the CTL field is comprised of 2 bits, the LEN field of 4 bits, the SEQ field of 18 bits, the DATA field of 144 bits (for the Rate Set 1) and 240 bits (for the Rate Set 2), the SEQ_HI field of 1 bit, and the TYPE field of 1 bit.

Referring to FIG. 7D, the data frame is comprised of a CTL field, a LEN field, a SEQ field, a DATA field, a PADDING field, a SEQ_HI field and a TYPE field. For example, the CTL field is comprised of 2 bits, the LEN field of 12 bits, the SEQ field of 18 bits, the DATA field of (LEN*8) bits, the SEQ_HI field of 1 bit, and the TYPE field of 1 bit. The data frames shown in FIGS. 7C and 7D are both transmitted without using the block sequence numbering method, and are different from each other in the number of the data bits filled in the DATA fields. Because of the difference, they are different from each other in the length of the LEN fields.

Referring to FIG. 7E, an idle frame is comprised of a 16-bit SEQ field and a PADDING field. Referring to FIG. 7F, a status synchronization field is comprised of a CTL field, an L_V(S) field, an L_V(R) field, an L_V(N) field, a PADDING field, an FCS field, a PADDING field, and a TYPE field. The CTL field is filled with '11100101', and the TYPE field is filled with '0'. For example, the CTL field is comprised of 8 bits, the L_V(S) field of 20 bits, the L_V(R) field of 20 bits, the L_V(N) field of 20 bits, the FCS field of 16 bits, and the TYPE field of 1 bit.

In FIGS. 8A to 8C, a maximum of one data frame is available for a data block transmitted over the supplemental channel. FIG. 8A corresponds to a case where the data frame is transmitted according to the block sequence numbering method, and FIGS. 8B and 8C correspond to a case where the data frame is transmitted in the byte sequence numbering method rather than the block sequence numbering method. Whether the data frame to be transmitted over the supplemental channel follows the block sequence numbering method can be determined from the TYPE field of the data frame. When the TYPE field is '0', the data frame follows the block sequence numbering method. When the TYPE field is '1', the data frame does not follow the block sequence numbering method.

Referring to FIG. 8A, the data frame is comprised of a TYPE field, a PADDING field, a SEQ field and a DATA field. The TYPE field is filled with '0'. For example, the TYPE field is comprised of 1 bit, the PADDING field of 2 bits, and the SEQ field of 9 bits.

Referring to FIG. 8B, the data frame is comprised of a TYPE field, a SEQ field, and a DATA field. For example, the TYPE field is comprised of 1 bit, and the SEQ field of 19 bits. Referring to FIG. 8C, the data frame is comprised of the SEQ field and the DATA field. For example, the SEQ field is comprised of 19 bits.

The RLP controller 131 performs a reestablish process before transmitting the data. The RLP controller 131 continuously transmits the SYNC frame to the multiplexing/demultiplexing controller 140 as a data block.

The RLP controller 131 receives the SYNC frame from the multiplexing/demultiplexing controller 140, and continuously transmits the SYNC/ACK frame to the multiplexing/demultiplexing controller 140 until a physical channel frame, which is neither a null data block nor a SYNC frame, is received.

Upon receipt of the SYNC/ACK frame, the RLP controller 131 transmits an ACK frame to the multiplexing/demultiplexing controller 140. The RLP controller 131 continuously transmits the ACK frame until a physical channel frame, which is neither a null data block nor a SYNC/ACK frame, is received from the at multiplexing/demultiplexing controller 140. The RLP controller 131 starts data transmission, when a physical channel frame is received and the received data block is not a null data block and has an RLP frame which is not a SYNC/ACK frame.

Upon receipt of the ACK frame, the RLP controller 131 starts data transmission. The RLP controller 131 can transmit other frames excepting the SYNC, SYNC/ACK, ACK frames to the multiplexing/demultiplexing controller 140.

2. Data Transmitting Operation of the RLP Controller

For data transmission, the RLP controller 131 uses the 20-bit sequence number register L_V(S) 132. The RLP controller 131 determines a sequence number SEQ to be attached to the frame from the sequence number register L_V(S) 132. The sequence number uses a signless modulo $2^{20}$ operation. For a sequence number N, it is said that the sequence numbers from (N+1) modulo $2^{19}$ to (N+$2^{19}$−1) modulo $2^{20}$ is larger than N, and the sequence numbers from (N−$2^{19}$) modulo $2^{20}$ to (N−1) modulo $2^{20}$ is smaller than N.

When transmitting data, the RLP controller 131 assigns a 20-bit sequence number to every data block. This value is generated by the L_V(S) register 132. The RLP controller 131 always indicates a sequence number of the first data byte when transmitting the frame. The RLP controller 131 can indicate the 19 low bits of the 20-bit sequence number or indicate a 9-bit value as proposed in an embodiment of the invention, to indicate the sequence number of the first data byte.

3. FCH Data Transmitting Operation of the RLP Controller

The RLP controller 131 determines the sequence number assigned to a frame transmitted by using the 12-bit sequence number register L_V(S) 132. The sequence numbers are achieved by a signless modulo $2^{12}$ operation. For the sequence number 'N', the sequence numbers from (N+1) modulo $2^{11}$ to (N+$2^{11}$−1) modulo $2^{12}$ are referred to as greater than 'N', and those from (N+$2^{11}$) modulo $2^{12}$ to (N−1) modulo $2^{12}$ as less than 'N'. When transmitting data, the RLP controller 131 assigns a 12-bit sequence number to each new frame. In actual data transmission, the RLP controller 131 attaches the lower 8 bits of the 12-bit frame sequence number to the data frame.

The multiplexing/demultiplexing controller 140 of the transmission side sends a request for a data block to be transmitted over the fundamental channel to the RLP controller 131 so that the RLP controller 131 generates the frame. The multiplexing/demultiplexing controller 140 of the transmission side also sends size information of the data block to be created by the RLP controller 131, while sending the data block request to the RLP controller 131.

The RLP controller 131 creates the data block to be transmitted over the fundamental channel according to the following priority order.

1. control frame (SYNC, SYNC/ACK, ACK, NAK)
2. retransmitted data frame
3. data frame
4. idle frame When there is a control frame to transmit, the RLP controller 131 creates the control frame as follows. For the SYNC, SYNC/ACK and ACK frames, the RLP controller 131 sets the SEQ field to '00000000', a CTL field according to the frame type, and attaches an FCS field thereto, as shown in FIG. 7A. The FCS field is a 16-bit frame check sequence created by a polynomial specified by RFC-1662. The FCS field is created for all the preceding bits. The RLP controller 131 sets the portion following the FCS field to all 0's according to the size information provided from the multiplexing/demultiplexing controller 140. After setting the type field of the last 1 bit of the data block to '1', the RLP controller 131 transmits the generated data block to the multiplexing/demultiplexing controller 140.

When there is data to be retransmitted, the RLP controller 131 generate a NAK frame and transmits it to the multiplexing/demultiplexing controller. The NAK frame has a structure shown in Table 14 below.

TABLE 14

NAK frame

| Field | Length |
|---|---|
| SEQ | 8 bits |
| CTL | 8 bits |
| NAK_COUNT | 2 bits |
| The following fields are filled as many times as NAK_COUNT + 1: | |
| NAK_TYPE_AND_UNIT | 4 bits |
| When NAK_TYPE_AND_UNIT is '0001', the following fields are filled: | |
| FIRST | 12 bits |
| LAST | 12 bits |
| When NAK_TYPE_AND_UNIT is a value defined in Table 15 or 16, the following fields are filled: | |
| NAK_MAP_SEQ | 12 bits |
| NAK_MAP | 8 bits |
| When NAK_TYPE_AND_UNIT is '1111', the following fields are filled: | |
| NAK_MAP_SEQ | 12 bits |
| FIRST | 13 bits |
| LAST | 13 bits |
| For any NAK_TYPE, the following fields are filled: | |
| PADDING_1 | Variable Length |
| FCS | 16 bits |
| PADDING_2 | Variable Length |
| TYPE | 1 bit |

In Table 14, the RLP controller 131 creates a NAK frame as follows. The SEQ field is set to '00000000', the CTL field to '11110100', and the TYPE field to '1'. The RLP controller 131 sets the NAK_COUNT field to a value determined by subtracting one from the retransmission request number included in the NAK frame. The RLP controller 131 performs the (NAK_COUNT+1) retransmission requests. As can be appreciated from Table 14, the retransmission request is comprised of a NAK_TYPE_AND_UNIT field, and FIRST and LAST fields or NAK_MAP_SEQ and NAK_MAP fields according to the value of the NAK_TYPE_AND_UNIT field. When the NAK_TYPE_AND_UNIT field of the retransmission request is set to '0001', the RLP controller 131 fills the FIRST field with the frame sequence number of the first frame for continuously requesting retransmission and fills the LAST field with the frame sequence number of the last frame.

If the RLP controller 131 sets NAK_TYPE_AND_UNIT to '0010', the retransmission request is the NAK MAP for a frame having the NAK_MAP_SEQ field and NAK_MAP field. When requesting the retransmission of a plurality of discontinuous frames, the RLP controller 131 sets the NAK_TYPE_AND_UNIT to '0010', and fills the NAK MAP as follows: The sequence number of the first frame requested for retransmission is put into the NAK_MAP-SEQ field. Also, if there is required retransmission of the RLP frame corresponding to the sequence number of (NA_MAP_SEQ+n) modulo $2^{12}$, the $n^{th}$ bit from the uppermost of the NAK_MAP is set to '1'. The 'n' may have a value from 1 to 8. For example, if the NAK_TYPE_AND_UNIT field is set to '0010', and for the transmission rate set 1, NAK_MAP_SEQ to '0', and NAK_MAP to '10000000', the RLP controller should retransmit the frames respectively assigned with '0' and '1'.

The RLP controller 131 may set the NAK_TYPE_AND_UNIT field as shown in Table 15 or 16 below. When the RLP controller 131 sets the NAK_TYPE_AND_UNIT field as shown in Table 15 or 16, the transmission request is performed in a NAK MAP method for the data having the NAK_MAP_SEQ field and the NAK_MAP field.

TABLE 15

NAK_TYPE_AND_UNIT field (Rate Set 1)

| Field Value | Number of Sequence Number |
|---|---|
| '0011' | 19 |
| '0100' | 41 |
| '0101' | 42 |
| '0110' | 90 |
| '0111' | 186 |
| '1000' | 378 |
| '1001' | 762 |
| 1010 | 1530 |

TABLE 16

NAK_TYPE_AND_UNIT field (Rate Set 2)

| Field Value | Number of Sequence Number |
|---|---|
| '0011' | 31 |
| '0100' | 65 |
| '0101' | 66 |
| '0110' | 138 |
| '0111' | 282 |
| '1000' | 318 |
| '1001' | 570 |
| '1010' | 1146 |
| '1010' | 2586 |

The RLP controller 131 fills the NAK_MAP field and NAK_MAP_SEQ field based on Table 15 or 16. The sequence number of the frame requested for retransmission is put in the NAK_MAP_SEQ field, and the sequence numbers of the data segments requested for retransmission in the unit shown in Table 15 or 16 are put in the NAK_MAP field. By using the NAK_MAP, the RLP controller 131 requests retransmission for the data contained in the frame corresponding to the sequence numbers from ((n−1)*U) to (n*U−1) with the unit determined by the NAK_TYPE_AND_UNIT field being U, whenever the $n^{th}$ bit from the most significant bit (MSB) of the NAK_MAP is '1'. The value 'n' can have a value of 1 to 8. For example, for Rate Set 1 when the NAK_TYPE_AND_UNIT field is set to '0011', the NAK_MAP_SEQ field is set to '0' and the NAK_MAP field is set to '10000000', the RLP controller should retransmit the data of sequence numbers 0 to 18 in the data part of the frame assigned with the frame sequence number 0.

When the RLP controller 131 sets the NAK_TYPE_AND_UNIT field to '1111', the retransmission request comes to have the NAK_MAP_SEQ field, and FIRST and LAST fields. The RLP controller 131 fills the NAK_MAP_SEQ field with the sequence number of the RLP frame having contained the data segment requested for retransmission, the FIRST field with the sequence number of the first byte data of the segment, and the LAST field with the sequence number of the last byte data.

The RLP controller 131 creates the (NAK_COUNT+1) transmission requests and puts them in the NAK frame, pads the FCS field with 0's for byte alignment, and then fills the FCS field. The FCS field is a 16-bit frame check sequence created by a polynomial specified in RFC-1662. The FCS field is created for all the preceding bits. After filling the FCS field, the RLP controller 131 fills the remaining portion of the data block with 0's.

The RLP controller 131 may use one of the formats shown in FIGS. 7B to 7F for sending retransmission or new data. The formats of FIGS. 7B and 7D are used for sending a retransmission or new data frame, but not a segmented frame. When transmitting a new data, the RLP controller 131 assigns a 12-bit sequence number to the new data frame in the values of the L_V(S) register. The RLP controller 131 sets the SEQ field to the lower 8-bit value of the 12-bit sequence number, and the REXMIT field to '0'. Transmitting the new data frame, the RLP controller 131 increases the value of the L_V(S) 132 by one, set as a modulo $2^{12}$ value. The RLP controller 131 increases the value of the sequence number register L_V(S) 132 only when generating a data frame containing new data. Namely, the value of the register 132 is not increased when sending the retransmission data, control frame, and idle frame. The RLP controller 131 stores newly transmitted data frames with their sequence numbers into the resequencing buffer 133, from which the data frame identified by the sequence number requested by the receiving end is retrieved for retransmission. When retransmitting a missing data frame, the RLP controller 131 sets the SEQ field with the lower 8 bits of the sequence number of the retransmitted data frame, and the REXMIT field to '1'.

Referring to FIGS. 7C, 7E and 7F for illustrating the formats employed for transmitting segmented frames, the RLP controller 131 generates segmented frames when the size of the data frame for retransmission can not be loaded in the RLP frame having the size of the data block demanded by the multiplexing/demultiplexing controller, or a portion of the data frame is only demanded by the receiving RLP controller. In this specification, a portion of the data frame for retransmission is referred to as 'data segment'. For example, if the first 5 bytes of 20 bytes data transmitted in an RLP frame assigned with a sequence number '0' is to be retransmitted, the 5 bytes portion of the frame becomes a data segment. The RLP controller 131 assigns respectively 13-bit sequence numbers starting from '0' to the first to last byte of the data segment for the receiving RLP controller to determine the correct position of the data segment in the received data frame. Namely, the first byte of the data segment is assigned with a sequence number '0', the last $N^{th}$ byte with a sequence number 'N-1', and an intermediate byte with a sequence number obtained by increasing one by one starting from '0'.

The RLP controller 131 stores the frame sequence number of the frame containing the data segment requested for retransmission into the L_V(RET) register 143, the data sequence number of the first data byte of the data segment into the V(SEG) register 139, the address of the memory storing the first data byte into the P(SEG) register 141, and the length of the data segment into the LEN register 143. The RLP controller 131 determines the format of the RLP frame according to the value of the V(SEG) register 129 storing the data sequence number of the first data byte and the value of the LEN register 143 storing the continuous data size. For example, the RLP controller 131 uses the format of FIG. 7C if meeting the following conditions:

1. The value of the V(SEG) register 139 is a multiple of the number B (i.e., a multiple of 19 at Rate Set 1 and a multiple of 31 at Rate Set 2) of data bytes transmitted with the format of FIG. 7C.

2. The value of the LEN register 143 is equal to or greater than the size B allowed for transmission in the format of FIG. 7C (i.e., greater than 19 or 31 bytes). Or otherwise, the format of FIG. 7E or 7F is used.

When using the format of FIG. 7C, the RLP controller 131 sets the SEQ field with the lower 8-bit value of the L_V (RET) register 143, and then stores the frame sequence number of the data frame with the result obtained by dividing the number of data 'B' transmitted in the format of FIG. 7C into the value of the V(SEG) register 139. In addition, the RLP controller 131 sets the TYPE field to '1', CTL_HI field to '0', and fills the DATA field with the data transmitted.

When transmitting data in the format of FIG. 7E or 7F, the RLP controller 131 determines the format of the frame according to the value of the LEN register 142 storing the continuous data size to transmit. Namely, if the value of the LEN register 142 is equal to or greater than the size allowed for transmitting in the format of FIG. 7E (i.e., more than 18 or 30 bytes), the format of FIG. 7E is used for transmission. Or otherwise, the format of FIG. 7F is used.

When using the format of FIG. 7E, the RLP controller 131 sets the SEQ field with the lower 8-bit value of the L_V (RET) register 143 storing the frame sequence number of the data frame, the 13-bit SEG field with the value of the V(SEG) register 139, and the END field to '1' or '0' according as the transmitted data segment is the last portion of the data frame or not. In addition, it sets the TYPE field to '1', CTL_HI field to '1', and fills the DATA field with the data segment transmitted.

When using the format of FIG. 7F, the RLP controller 131 sets the SEQ field with the lower 8-bit value of the L_V (RET) register 143 storing the frame sequence number of the data frame, the 13-bit SEG field with the value of the V(SEG) register 139, and the END field to '1' or '0' according to whether the transmitted data segment is the last portion of the data frame or not. In addition, it sets the TYPE field to '1', CTL_HI field to '1', CTL field to '11000', LEN field with the number of the bytes of the data segment transmitted, and fills the DATA field with the data segment transmitted. It should be noted that the RLP controller 131 uses the format of FIG. 7E or 7F to transmit the data segment corresponding to the end portion of the data frame.

Generating the segmented RLP frame containing the data segment, the RLP controller 131 reduces the value of the LEN register 142 by the size of the transmitted data segment, increases the value of the V(SEG) register 139, and points the P(SEG) to the first data byte of the data segment transmitted. In this case, if the value of the LEN register 142 becomes '0', the RLP controller 131 sets all the L_V(RET) register 143, V(SEG) register 139, and P(SEG) register to '0'.

If there is no new data, retransmission data, or control frame, the RLP controller 131 may transmit a data frame in the format of FIG. 7D. In this case, transmitted to the multiplexing/demultiplexing controller 140 is a data frame of which the SEQ field is set with the lower 8 bits of the L_V(S) register 132, TYPE field to '1', CTL_HI field to '1', CTL field to '0', LEN field to '0', and the remaining field to '0'.

Figure 7G:
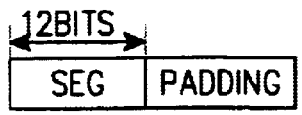

When the multiplexing/demultiplexing controller 140 requests a data block with a size of 16, 20, or 32 bits, and there is no new data, retransmission data, or control frame, the RLP controller 131 may transmit an idle frame in the format of FIG. 7G, of which the SEQ field is filled with the 12-bit value of the L_V(S) register 132, and the remaining field with '0'.

4. FCH Data Receiving Operation of the RLP Controller

The multiplexing/demultiplexing controller 140 informs the RLP controller 131 of the received data block and its size. Upon receipt of the SYNC, SYNC/ACK and ACK frames out of the control frames, the RLP controller 131 performs the reestablish process. Upon receipt of the NAK frame out of the control frames, the RLP controller 131 analyzes the NAK frame according to Table 15 and retransmits the requested data bytes.

Receiving a new data frame in the format of FIG. 7B or 7D, the RLP controller 131 first calculates a sequence number L_SEQ using the 8-bit SEQ field of the received frame and the L_V(R) register 135, in accordance with the following Equation 1:

$$L\_SEQ=[L\_V(R)+\{2^8+SEQ-(L\_V(R) \bmod 2^8)\} \bmod 2^M] \bmod 2^{12} \quad [\text{Equation 1}]$$

When receiving the retransmitted data frame in the format of FIG. 7B or 7D, the RLP controller 131 should have the NAK list 137 as shown in FIG. 4, of which each entry has a field for recording whether the 12-bit sequence number and its corresponding data byte are received, and a retransmission timer and abort timer. The RLP controller 131 detects the NAK entry of which the value of the lower 8 bits of the 12-bit sequence number agrees with the value contained in the 8-bit SEQ field of the received retransmission frame. If there is the same NAK entry, the value of the frame sequence number L_SEQ stored in the NAK entry is taken as the sequence number of the received frame. However, if there is no such entry, the RLP controller 131 discards the received frame.

The RLP controller 131 compares the sequence number L_SEQ of the received frame, the 12-bit sequence number registers L_V(N) 135, and the L_V(R) register 136, as follows:

First, when the sequence number L_SEQ is larger than or equal to the L_V(N) register 135 and smaller than L_V(R) register 136, the RLP controller 131 regards this as a retransmission data frame.

Second, when the sequence number L_SEQ is larger than or equal to the L_V(R) register 136 and smaller than a value determined by modulo $2^{12}$ adding the L_V(R) register 136 to the E register 134, the RLP controller 131 regards this as new data.

Third, when the sequence number L_SEQ is larger than or equal to the value determined by modulo $2^{12}$ adding the L_V(R) register 136 to the E register 134, the RLP controller 131 regards this as a duplicated frame.

At the arrival of the data regarded as duplicated frame, the RLP controller 131 discards the duplicated data, since it has been previously received.

If the received data is regarded as retransmitted data, the RLP controller131 performs the following operation:

First, when the sequence number L_SEQ of the received frame is larger than or equal to L_V(N) and smaller than L_V(R), the RLP controller 131 stores the received data byte in the rearrange buffer 138. If the sequence number value L_SEQ is equal to L_V(N), the RLP controller 131 transmits to the upper link protocol the data frame stored in the rearrange buffer 138 from the data frame having the L_V(N) value as the sequence number to the data frame having the sequence number which can be consecutively transmitted. The RLP controller 131 records the fact that a desired data frame is received at the NAK entry which has the same sequence number as the received data frame.

Second, when the sequence number L_SEQ of the received data frame is equal to L_V(R), and L_V(R) is equal to L_V(N), the RLP controller 131 increases both L_V(R) modulo $2^{12}$ and L_V(N) modulo $2^{12}$. The RLP controller 131 delivers the data part of the received frame to the reception data buffer. Otherwise, when the sequence number L_SEQ of the received frame is equal to L_V(R), and L_V(R) is not equal to L_V(N), the RLP controller 131 increases L_V(R) modulo $2^{12}$. In this case, the RLP controller 131 stores the data part of the received frame in the rearrange buffer 138.

Third, when the sequence number L_SEQ of the received frame is larger than L_V(R), the RLP controller 131 creates an entry for each data byte in the NAK list 137 in order to request retransmission for the frame having (L_SEQ−1) modulo $2^{12}$ in the sequence number L_V(R). Each entry has the 12-bit sequence number for the corresponding frame. In addition, the RLP controller 131 stores the data part of the received frame in the rearrange buffer 138 and sets L_V(R) to (L+1) modulo $2^{12}$.

Receiving a frame in the format of FIG. 7C, 7E or 7D, the RLP controller 131 searches the NAK entry stored in the NAK list 137 where the value of the lower 8 bits of the 12-bit sequence number is the same as the value contained in the 8-bit SEQ field of the retransmitted frame. If there is such an entry, the frame sequence number L_SEQ stored in the NAK entry is taken as the sequence number of the received frame. Otherwise, the RLP controller 131 discards the received frame.

Receiving a frame in the format of FIG. 7C, the RLP controller 131 calculates the 13-bit data sequence number L of the first byte of the received data segment by multiplying the value of the SEG field by the size of the received data segment. Thus, the sequence number of the last data byte is obtained by subtracting one from the sum of the sequence number L and the size B of the received data segment (L+B−1), and the intermediate sequence number by increasing one by one from the sequence number L of the first byte.

If a frame in the format of FIG. 7E or 7F is received, the RLP controller 131 takes the 13-bit data sequence number of the received data segment as the SEG field value. Thus, the sequence number of the last data byte is obtained by subtracting one from the sum of the sequence number L and the size B of the received data segment (L+B−1), and the intermediate sequence number by increasing one by one from the sequence number L of the first byte.

Receiving a frame in the format of FIG. 7E or 7F with the END field set to '1', it indicates that the last data segment of the retransmitted data part has come. Thus, the whole retransmitted frame from the data byte assigned with the sequence number '0' to the last data byte of the last data segment is delivered to the subsequent processing step. However, if there is a missing data byte between the first and the last data byte, or the last data segment is not received, the RLP controller 131 reserves all of the received sequence numbers from the sequence number 0 to the greatest sequence number presently received.

Meanwhile, receiving the idle frame, the RLP controller 131 sets the sequence number L_SEQ as the SEQ field value. If the value of the sequence number L_SEQ of the received idle frame is greater than that of the L_V(R) register 136, the RLP controller 131 generates the entry of each data byte in the NAK list in order to request retransmission of the data byte having (L_SEQ−1) modulo $2^{12}$ in the sequence number L_V(R). Each entry has a 12-bit sequence number of the corresponding frame. The RLP controller 131 sets the L_V(R) to (L+1) modulo $2^{12}$. If the value of the sequence number L_SEQ of the received idle frame is less than that of the L_V(R) register 136, the RLP controller 131 performs the above reestablish procedure.

After determining the maximum number M of the data bytes of the damaged data block, the RLP controller 131 adds this value to the value stored in the E register 134 and stores again the added value in the E register 134. If the value determined by adding modulo $2^{12}$ the increased E register 134 to the L_V(R) register 136 is greater than the value of the L_V(N) register 135, the RLP controller 131 performs the reestablish process.

If there exists at least one data block, which is not a null data block and is received correctly or if the multiplexing/demultiplexing controller 131 informs the RLP controller 131 that no frame is received, the RLP controller 131 sets the E register 134 to '0'.

5. SCH Data Transmitting Operation of the RLP Controller

The multiplexing/demultiplexing controller 140 of the transmission side sends a request for a data block to be transmitted over the supplemental channel to the RLP controller 131 so that the RLP controller 131 generates the frame. The multiplexing/demultiplexing controller 140 of the transmission side also sends the RLP controller 131 the size information of the data block that the RLP controller 131 should create.

The RLP controller 131 creates the data block to be transmitted over the supplemental channel according to the following priority order:

1. retransmission data frame
2. new data frame

When there is retransmission data or new transmission data, the RLP controller 131 may use one of the formats shown in FIGS. 8A to 8C. The format of FIG. 8A is used for sending a new data frame or retransmission frame. The RLP controller 131 sets the frame sequence number of a new data to transmit as the value of the L_V(S) register 132. When using the format of FIG. 8A, the RLP controller 131 sets the SEQ field to the lower 8 bits of the above obtained sequence number, REXMIT field to '0', TYPE field to '0', and fills the DATA field with the data to transmit. However, for the retransmission data, the RLP controller 131 sets the SEQ field to the lower 8 bits of the original sequence number of the transmitted frame, REXMIT field to '1', TYPE field to '0', and fills the DATA field with the data to transmit.

The formats of FIGS. 8B and 8C are used to transmit segmented frames. When generating segmented frames, the RLP controller 131 stores the frame sequence number of the frame containing the data segment requested for retransmission into the L_V(SEG) register 139, the address of the memory storing the first byte of the retransmitted data segment into the P(SEG) register 141, and the size of the retransmitted data segment into the LEN register 142. The RLP controller 131 determines the format of the generated frame according to the sequence number of the first data byte of the retransmitted data segment and the size of the continuous data to transmit. Namely, the RLP controller 131 may use the format of the FIG. 8B if meeting the following conditions:

First, the value of the V(SEG) register 139 is a multiple of the number B of data bytes transmitted in the format of FIG. 8B, adapted for the size of the data block requested as described above.

Second, the value of the LEN register 142 is equal to or greater than the size B to be transmitted in the format of FIG. 8B. Or otherwise, the format of FIG. 8C is used.

The number B of data bytes to be transmitted in the format of FIG. 8B is the result in bytes obtained by subtracting the header size 18 bits in the format of FIG. 8B from the size of the data block requested by the multiplexing/demultiplexing controller. When using the format of FIG. 8B or 8C, the RLP controller 131 sets the SEQ field to the lower 8 bits of the L_V(RET) register 143 storing the frame sequence number of the data part. Also, the RLP controller 131 sets the 12-bit sequence number of the originally transmitted frame.

When using the format of FIG. 8B, the RLP controller 131 sets the TYPE field to '1', CTL field to '0', and fills the DATA field with the data to transmit. In addition, it sets the SEG field to the value obtained by dividing the number of the data bytes transmitted in the form of FIG. 8B into the value of the V(SEG) register 139.

When using the format of FIG. 8C, the RLP controller 131 sets the TYPE field to '1', CTL field to '100', and fills the DATA field with the data to transmit. In addition, it sets the SEG field to the value of the 13-bit V(SEG) register 139. If the data segment transmitting the END field is the last end of the data part, the RLP controller 131 sets the END field to '1', or otherwise to '0'. The RLP controller 131 should use the format of FIG. 8C to transmit the data segment corresponding to the last end of the data part.

The RLP controller 131 assigns the 12-bit sequence number to a new data frame in the register L_V(S) 132. If transmitting the new data frame, the RLP controller 131 increases the value of the L_V(S) register 132 by one, and sets it to the value obtained by performing a $2^{12}$ modulo operation on the increased value. As in the FCH transmission, the RLP controller 131 increases the value of the sequence number register L_V(S) 132 only when generating a data frame containing new data. Namely, the value of the L_V(S) register 132 is not increased when retransmitting data.

The RLP controller 131 stores the newly transmitted data part with its sequence number into the resequencing buffer 133, from which the data part is retrieved for retransmission upon the request of the receiving end by the sequence number. If there is no new data, retransmission data, or control frame to transmit, the RLP controller 131 sends a empty data block to the multiplexing/demultiplexing controller 140.

6. SCH Data Receiving Operation of the RLP Controller

The multiplexing/demultiplexing controller 140 of the receiving side provides the RLP controller 131 with the data block and information about the size T of the received data block. Then, the BUMP controller 131 checks the TYPE field of the first one bit. If the TYPE field has the value '0', the RLP controller 131 determines that a frame in the format of FIG. 8B has been received. However, if it is '1', the RLP controller 131 checks the CTL field of the second bit. If the value of the CTL field is '0', the RLP controller determines that a frame in the format of FIG. 8B has been received. However, if it is not '0', the RLP controller 131 checks the three bits of the second to fourth as the CTL field. If the value of the CTL field is '100', the RLP controller 131 determines that that a frame in the format of FIG. 8C has been received. However, if it is not '100', the RLP controller 131 determines that a damaged data block has been received.

When receiving a frame in the format of FIG. 8A, the RLP controller 131 firstly calculates the 8-bit SEQ field of the received frame, then checking the REXMIT field. If the REXMIT field has the value '0', the RLP controller 131 calculates the sequence number L_SEQ by using the value of the 8-bit SEQ field and the L_V(R) 135 based on Equation 1, as in the FCH. However, if the value of the REXMIT field is '1', the RLP controller 131 searches the NAK list 137 for the NAK entry of which the lower 8-bit value of the 12-bit sequence number agrees with the value contained in the 8-bit SEQ field. If such an entry is found, the value of the frame sequence number L_SEQ stored in the NAK entry is taken as the sequence number of the received frame. However, if not so, the RLP controller 131 discards the received frame.

The RLP controller 131, as in the FCH, compares the frame sequence number L_SEQ of the received frame, 12-bit sequence number L-V(N) register 135, and L_V(R) register 136, as follows:

First, if the sequence number L_SEQ is equal to or greater than the value of the L_V(N) register 135, and less than the value of the L_V(R) register 136, the RLP controller 131 considers it as the retransmitted data frame.

Second, if the sequence number L_SEQ is equal to or greater than the value of the L_V(N) register 135, and less than the value obtained by adding modulo $2^{12}$ the values of the L_V(R) register 136 and E register 134, the RLP controller 131 considers it as a new data frame.

Third, if the sequence number L_SEQ is equal to or greater than the value obtained by adding modulo $2^{12}$ the values of the L_V(R) register 136 and E register 134, the RLP controller 131 considers it as the duplicated data frame, discarded.

If the received data frame is considered as the retransmitted data frame, the RLP controller 131 performs the following steps:

First, if the sequence number L_SEQ is equal to or greater than L_V(N), and less than L_V(R), the RLP controller 131 stores the received data bytes into the rearrange buffer 138. In this case, if the sequence number L_SEQ is equal to L_V(N), the RLP controller 131 transfers the data frames stored in the rearrange buffer 138 from the sequence number L_V(N) to the last sequence number without data missing between both ends to the reception data buffer. Then, the RLP controller 131 records in the NAK entry having the same sequence number as the received data frame that the requested data frame has been received.

Second, if the sequence number L_SEQ is equal to L_V(R), and L_V(R) equal to L_V(N), the RLP controller 131 increases modulo $2^{12}$ both L_V(R) and L_V(N), and transfers the data part of the received frame to the reception data buffer. However, if the sequence number L_SEQ is equal to L_V(R), and L_V(R) not equal to L_V(N), the RLP controller 131 increases modulo $2^{12}$ L_V(R), and stores the data part of the received frame into the rearrange buffer 138.

Third, if the sequence number L_SEQ is greater than L_V(R), the RLP controller 131 generates the entry of each frame in the NAK list 137 in order to request retransmission of the frame having (L_SEQ-1) modulo $2^{12}$ in the sequence number L_V(R). Each entry has the 12-bit sequence number for the corresponding frame. In addition, the RLP controller 131 stores the data part of the received frame into the rearrange buffer 138, and sets L_V(R) to modulo $2^{12}$.

When receiving a frame in the format of FIG. 8B or 8C, the RLP controller 131 searches the NAK list 137 for the NAK entry of which the lower 8-bit value of the 12-bit sequence number agrees with the value contained in the 8-bit SEQ field. If there is such entry, the frame sequence number L_SEQ stored in the NAK entry is taken as the sequence number of the received frame. However, if not so, the RLP controller 131 discards the received frame.

When receiving a frame in the format of FIG. 8B, the RLP controller 131 calculates the 13-bit data sequence number L of the first byte of the received data segment by multiplying the value of the SEG field by the size of the received data segment. Then, the sequence number of the last data byte is obtained by subtracting one from the sum of the sequence number L and the size B of the data segment (L+B-1), and the intermediate sequence numbers by increasing one by one starting from the first byte.

Similarly, when receiving a frame in the format of FIG. 8C, the RLP controller 131 calculates the 13-bit data sequence number L of the first byte of the received data segment by multiplying the value of the SEG field by the size of the received data segment. Then, the sequence number of the last data byte is obtained by subtracting one from the sum of the sequence number L and the size B of the data segment (L+B-1), and the intermediate sequence numbers by increasing one by one starting from the first byte.

Receiving a frame in the format of FIG. 8C with the END field set to '1', it indicates that the last data segment of the retransmitted data part has come. Thus, the whole retransmitted frame from the data byte assigned with the sequence number '0' to the last data byte of the last data segment is delivered to the subsequent processing step. However, if there is a missing data byte between the first and the last data byte, or the last data segment is not received, the RLP controller 131 reserves all of the received sequence numbers from the sequence number 0 to the greatest sequence number presently received.

After determining the maximum number M of the data bytes of the damaged data block, the RLP controller 131, as in the FCH, adds this value to the value stored in the E register 134 and stores again the added value in the E register 134. If the resulting value determined by adding modulo $2^{12}$ the increased E register 134 to the L_V(R) register 136 is less than the value of the L_V(N) register 135, the RLP controller 131 performs the reestablish process.

If there exists at least one data block, which is not a null data block and is received correctly, or if the multiplexing/demultiplexing controller 131 informs the RLP processor 131 that no frame is received, the RLP controller 131 sets the E register 134 to '0'.

7. Operation of RLP Controller After Data Receiving

After processing all the received frames, the RLP controller 131 performs the following operation. When the received data block includes an idle frame or a new data frame, the RLP controller 131 performs the following processes on the entries in the NAK list 137 in the order of the older entries.

First, if an abort timer has not expired yet and the sequence number, included in the NAK entry, has been transmitted three times, the RLP controller 131 decreases the abort timer value by one. If the abort timer value becomes '0', the RLP controller 131 performs the following operation. If the RLP controller 131 has received the retransmitted data byte corresponding to the sequence number that the NAK entry already has, the RLP controller 131 deletes the NAK entry. Otherwise, if the RLP controller 131 has not received the retransmitted data byte corresponding to the sequence number that the NAK entry already has, the RLP controller 131 transmits to the reception data buffer the received data bytes stored in the rearrange buffer 138 which are larger than the sequence number of the NAK list and can be successively transmitted to the upper link protocol, considering that the data byte corresponding to the sequence number of the NAK entry is not received. If the RLP controller 131 has received data segments of the retransmitted data frame corresponding to the sequence number that the NAK entry already has, the RLP controller 131 transmits the received data segments to the reception data buffer, and then, the received data bytes stored in the rearrange buffer 138 which are larger than the sequence number of the NAK list stored in the rearrange buffer 138 and can be successively transmitted to the upper link protocol. The RLP controller 131 sets L_V(N) register 135 to the sequence number of the data byte to be received next.

Second, if the abort timer has not expired yet and the sequence number, that the NAK entry has, was included in the NAK which has already transmitted two times, the RLP controller 131 decreases the abort timer value by one. If the abort timer value becomes '0', the RLP controller 131 performs the following operation. If the RLP controller 131 has received the retransmitted data byte corresponding to the sequence number that the NAK entry already has, the RLP controller 131 deletes the NAK entry and sets the L_V(N) register 135 to the sequence number of the data byte to be received next. Otherwise, The RLP controller 131 includes the sequence numbers, that the NAK entry has, in the three NAK frames to be transmitted next. The RLP controller 131 sets the abort timer of the NAK entry to a proper value. If already having received data segments of the data frame corresponding to the sequence number, the RLP controller 131 requests the NAK frame to only retransmit the missing data segments by using the data sequence numbers of the received data segments.

The RLP controller 131 sets the retransmission timer to a proper value for the NAK entries which should be newly added, and includes the sequence numbers, that the NAK entry has, in the two NAK frames to be transmitted next.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for transmitting a plurality of data frames in a mobile telecommunications system, each data frame having a frame sequence number and a succeeding data stream, wherein a data stream within at least one data frame is segmented into a plurality of data segments when retransmission is requested, the method comprising the steps of:

providing a frame sequence number of a requested frame to each of said data segments;

providing a byte number corresponding to a start byte of each data segment to each of said data segments;

providing an indicator indicating whether or not each data segment is the last segment to each of said data segments; and providing a data stream to each of said data segments, thereby allowing the data segments to be of varying lengths, wherein a reception party uses the byte number for calculating data length information.

2. A device for transmitting a plurality of frames, each frame comprised of a frame sequence number and a succeeding data stream, comprising:

a forward resequencing buffer for storing data streams of transmitted frames together with associated frame sequence numbers, and for retransmitting requested frames;

a first register for storing a frame sequence number indicating a retransmission-requested frame;

a second register for storing a byte sequence number indicating a start byte of a frame segment obtained by segmenting a data stream of the retransmission-requested frame into a transmittable size; and a controller for reading the data stream in the retransmission-requested frame from the forward resequencing buffer, segmenting the read data stream into frame segments of the transmittable size, and adding the frame sequence number and the byte sequence number corresponding to a start byte of each frame segment to each frame segment before transmission, thereby allowing the data segments to be of varying lengths, wherein a reception party uses the byte sequence number for calculating data length information.

3. The device as claimed in claim 2, wherein the controller adds an indicator to each frame segment indicating whether each frame segment is the last frame segment of the retransmission-requested frame.

4. The device as claimed in claim 2, wherein the controller adds to each frame segment information indicating a size of each frame segment.

5. A method for receiving frames, each frame comprised of a frame sequence number and a succeeding data stream, in a communication system, the method comprising the steps of:

a) sending a retransmission request for a frame that failed to be received;

b) receiving one or more frame segments, said frame segments resulting from segmenting the retransmission-requested frame;

c) determining whether the one or more frame segments are from the retransmission-requested frame, depending on a frame sequence number included in the one or more frame segments;

d) examining byte sequence numbers of the data stream included in the one or more frame segments, when the one or more frame segments are the retransmission-requested frames;

e) repeating the steps c) and d), until it is determined that the last frame segment out of the frame segments is received; and f) arranging normally received frames and the frame segments according to the sequence numbers, thereby allowing the data segments to be of varying lengths, wherein a reception party uses the byte sequence numbers for calculating data length information.

6. A method for segmenting a data frame into frame segments, said data frame having a frame sequence number and data, the method comprising the steps of:

segmenting data within the data frame into one or more data segments;

placing each of the one or more data segments in a corresponding frame segment;

providing a frame sequence number of the data frame to each of the frame segments;

providing a byte number corresponding to a start byte of each of the one or more data segment to the frame segment containing the corresponding data segment; and providing an indicator in each frame segment, said indicator indicating whether the data segment in the frame segment is the last data segment of the one or more data segments of the data frame, thereby allowing the data segments to be of varying lengths, wherein a reception party uses the byte number for calculating data length information.

* * * * *